United States Patent
Saeki et al.

(10) Patent No.: US 10,696,228 B2
(45) Date of Patent: Jun. 30, 2020

(54) ON-VEHICLE DISPLAY CONTROL DEVICE, ON-VEHICLE DISPLAY SYSTEM, ON-VEHICLE DISPLAY CONTROL METHOD, AND PROGRAM

(71) Applicant: JVC KENWOOD Corporation, Yokohama-shi, Kanagawa (JP)

(72) Inventors: Izumi Saeki, Yokohama (JP); Hideaki Okamura, Yokohama (JP)

(73) Assignee: JVC KENWOOD Corporation, Yokohama-shi (JP)

(*) Notice: Subject to any disclaimer, the term of this patent is extended or adjusted under 35 U.S.C. 154(b) by 124 days.

(21) Appl. No.: 15/996,567

(22) Filed: Jun. 4, 2018

(65) Prior Publication Data
US 2018/0272940 A1    Sep. 27, 2018

Related U.S. Application Data

(63) Continuation of application No. PCT/JP2016/089117, filed on Dec. 28, 2016.

(30) Foreign Application Priority Data

| Mar. 9, 2016 | (JP) | 2016-046009 |
| Mar. 9, 2016 | (JP) | 2016-046145 |
| Mar. 9, 2016 | (JP) | 2016-046146 |

(51) Int. Cl.
*B60R 1/00* (2006.01)
*G06K 9/00* (2006.01)
(Continued)

(52) U.S. Cl.
CPC .............. *B60R 1/00* (2013.01); *B60R 1/12* (2013.01); *G06K 9/00805* (2013.01);
(Continued)

(58) Field of Classification Search
CPC ..... B60R 1/00; B60R 1/12; B60R 2001/1215; B60R 2300/105; B60R 2300/20;
(Continued)

(56) References Cited

U.S. PATENT DOCUMENTS

| 8,144,033 B2* | 3/2012 | Chinomi .................. B60R 1/00 340/434 |
| 2001/0016797 A1* | 8/2001 | Ogura ..................... G06T 7/246 701/301 |

(Continued)

FOREIGN PATENT DOCUMENTS

| JP | 2009-081666 | 4/2009 |
| JP | 2015-009646 | 1/2015 |

OTHER PUBLICATIONS

International Search Report and Written Opinion for International Patent Application No. PCT/JP2016/089117 dated Mar. 28, 2017, 9 pages.

*Primary Examiner* — Peter D Le
(74) *Attorney, Agent, or Firm* — Amin, Turocy & Watson, LLP

(57) ABSTRACT

A device comprises: a rear video data acquiring unit 42 configured to acquire first video data from a rear camera that is arranged on a rear part of the vehicle and configured to image a rear side of the vehicle; a clipping unit 50 configured to clip a first area that is a part of the first video data acquired by the rear video data acquiring unit 42; a detecting unit 70 configured to perform moving object recognition and detect presence of a rear moving object in the first video data; and a display control unit 90 configured to display video clipped as the first area on a rearview monitor 140 that displays rear video of the vehicle, and display video clearly indicating presence of a detected rear moving object if the detecting unit 70 detects presence of the rear moving object.

8 Claims, 22 Drawing Sheets

(51) Int. Cl.
  *G06T 11/60*   (2006.01)
  *B60R 1/12*    (2006.01)
  *H04N 7/18*    (2006.01)

(52) U.S. Cl.
  CPC ............ *G06T 11/60* (2013.01); *H04N 7/188* (2013.01); *B60R 2001/1215* (2013.01); *B60R 2300/105* (2013.01); *B60R 2300/20* (2013.01); *B60R 2300/30* (2013.01); *B60R 2300/307* (2013.01); *B60R 2300/802* (2013.01); *B60R 2300/8066* (2013.01)

(58) Field of Classification Search
  CPC .......... B60R 2300/30; B60R 2300/307; B60R 2300/802; B60R 2300/8066; G06K 9/00805; G06T 11/60; H04N 7/188
  See application file for complete search history.

(56) References Cited

U.S. PATENT DOCUMENTS

| | | | |
|---|---|---|---|
| 2002/0087269 A1* | 7/2002 | Sasaki | B60R 1/00 701/301 |
| 2002/0186298 A1* | 12/2002 | Ikeda | B60K 35/00 348/148 |
| 2004/0215383 A1* | 10/2004 | Yanai | G08G 1/166 701/45 |
| 2004/0227647 A1* | 11/2004 | Yanai | B60R 1/00 340/995.1 |
| 2005/0049766 A1* | 3/2005 | Tanaka | B62D 15/0285 701/36 |
| 2005/0128061 A1* | 6/2005 | Yanai | B60R 1/00 340/435 |
| 2005/0174429 A1* | 8/2005 | Yanai | B60R 1/00 348/148 |
| 2005/0248859 A1* | 11/2005 | Platzer, Jr. | B60R 1/081 359/843 |
| 2006/0038895 A1* | 2/2006 | Suzuki | B60R 1/00 348/222.1 |
| 2006/0069478 A1* | 3/2006 | Iwama | B62D 15/0245 701/36 |
| 2008/0143833 A1* | 6/2008 | Yanai | B60R 1/00 348/148 |
| 2008/0143835 A1* | 6/2008 | Abe | B60R 1/00 348/148 |
| 2009/0079553 A1* | 3/2009 | Yanagi | B60R 1/00 340/435 |
| 2010/0220189 A1* | 9/2010 | Yanagi | B60R 1/00 348/148 |
| 2011/0115615 A1* | 5/2011 | Luo | B60R 1/00 340/436 |
| 2011/0181728 A1* | 7/2011 | Tieman | B60R 1/00 348/148 |
| 2012/0062743 A1* | 3/2012 | Lynam | B60Q 9/005 348/148 |
| 2012/0093358 A1* | 4/2012 | Tschirhart | B60R 1/00 382/103 |
| 2012/0105638 A1* | 5/2012 | Englander | B60Q 1/24 348/148 |
| 2012/0105643 A1* | 5/2012 | Ozaki | B60R 1/00 348/148 |
| 2012/0127312 A1* | 5/2012 | Nagamine | B60R 1/00 348/148 |
| 2012/0154591 A1* | 6/2012 | Baur | B60R 1/00 348/148 |
| 2012/0249789 A1* | 10/2012 | Satoh | G06K 9/00832 348/143 |
| 2013/0063601 A1* | 3/2013 | Wakabayashi | B60R 1/00 348/148 |
| 2014/0009614 A1* | 1/2014 | Yoon | G06K 9/00791 348/148 |
| 2014/0055616 A1* | 2/2014 | Corcoran | B60R 1/00 348/148 |
| 2014/0152774 A1* | 6/2014 | Wakabayashi | G08G 1/168 348/46 |
| 2014/0354816 A1* | 12/2014 | Inanobe | B60R 1/00 348/148 |
| 2015/0217692 A1* | 8/2015 | Yanagawa | B60R 1/00 348/118 |
| 2015/0278611 A1* | 10/2015 | Chi | G06K 9/00798 348/148 |
| 2015/0284001 A1* | 10/2015 | Watanabe | H04N 7/18 701/36 |

* cited by examiner

ON-VEHICLE DISPLAY CONTROL DEVICE, ON-VEHICLE DISPLAY SYSTEM, ON-VEHICLE DISPLAY CONTROL METHOD, AND PROGRAM

CROSS-REFERENCE TO RELATED APPLICATION(S)

This application is a continuation of International Application No. PCT/JP2016/089117, filed on Dec. 28, 2016 which claims the benefit of priority of the prior Japanese Patent Application No. 2016-046009, filed on Mar. 9, 2016, Japanese Patent Application No. 2016-046145, filed on Mar. 9, 2016 and Japanese Patent Application No. 2016-046146, filed on Mar. 9, 2016, the entire contents of which are incorporated herein by reference.

BACKGROUND

The present disclosure relates to an on-vehicle display control device, an on-vehicle display system, an on-vehicle display control method, and a program.

There is a known technology for displaying video from a rear camera that images a rear surrounding area of a vehicle and displaying video from side cameras that image side surrounding areas of the vehicle, instead of a rearview mirror for checking a rear side of the vehicle, a left side mirror, and a right side mirror (for example, see Japanese Patent Application Laid-open No. 2015-009646 A).

Incidentally, blind spots exist in the side mirrors of a vehicle because the vehicle appears in the mirrors thereof. Even in a case where the side cameras are used instead of the left and right side mirrors, blind spots exist in the same way. Therefore, it is difficult for a driver to check rear moving objects including following vehicles located in the blind spots. In view of the foregoing situations, there is a demand for a technology capable of appropriately checking surroundings of a vehicle.

SUMMARY

It is an object of the present disclosure to at least partially solve the problems in the conventional technology.

An on-vehicle display control device according to one aspect includes a rear video data acquiring unit configured to acquire first video data from a rear camera that is arranged on a rear part of the vehicle and that is configured to image a rear side of the vehicle, a clipping unit configured to clip a first area that is a part of the first video data acquired by the rear video data acquiring unit, an identifying unit configured to identify a second area in the first video data, the second area being located on a lateral side of the first area and checked by a lateral rear checking device of the vehicle, a detecting unit configured to detect presence and a moving direction of a rear moving object by performing moving object recognition in the first video data, and a display control unit configured to cause a rearview monitor that displays rear video of the vehicle to display video clipped as the first area, and cause the lateral rear checking device and the rearview monitor to perform display indicating identity of the rear moving object moving across the first area and the second area if the detecting unit detects the rear moving object moving across the first area and the second area.

An on-vehicle display control method according to one aspect includes steps of acquiring first video data from a rear camera that is arranged on a rear part of a vehicle and that is configured to image a rear side of the vehicle, clipping a first area that is a part of the first video data acquired at the acquiring step, detecting presence and a moving direction of a rear moving object by performing moving object recognition in the first video data, and causing a rearview monitor that displays rear video of the vehicle to display video clipped as the first area, and causing the lateral rear checking device and the rearview monitor to perform display indicating identity of the rear moving object moving across the first area and a second area if the detecting step detects the rear moving object moving across the first area and the second area, the second area being located on a lateral side of the first area and checked by a lateral rear checking device of the vehicle.

A non-transitory storage medium stores a program according to one aspect for causing a computer serving as an on-vehicle display control device to execute steps of acquiring first video data from a rear camera that is arranged on a rear part of a vehicle and that is configured to image a rear side of the vehicle, clipping a first area that is a part of the first video data acquired at the acquiring step, detecting presence and a moving direction of a rear moving object by performing moving object recognition in the first video data, and causing a rearview monitor that displays rear video of the vehicle to display video clipped as the first area, and causing the lateral rear checking device and the rearview monitor to perform display indicating identity of the rear moving object moving across the first area and the second area if the detecting step detects the rear moving object moving across the first area and the second area, the second area being located on a lateral side of the first area and checked by a lateral rear checking device of the vehicle.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Embodiments of an on-vehicle display control device 10, an on-vehicle display system 1, an on-vehicle display control method, and a program according to the present disclosure will be described in detail below with reference to the accompanying drawings. The present invention is not limited by the embodiments below.

First Embodiment

Figure 1:
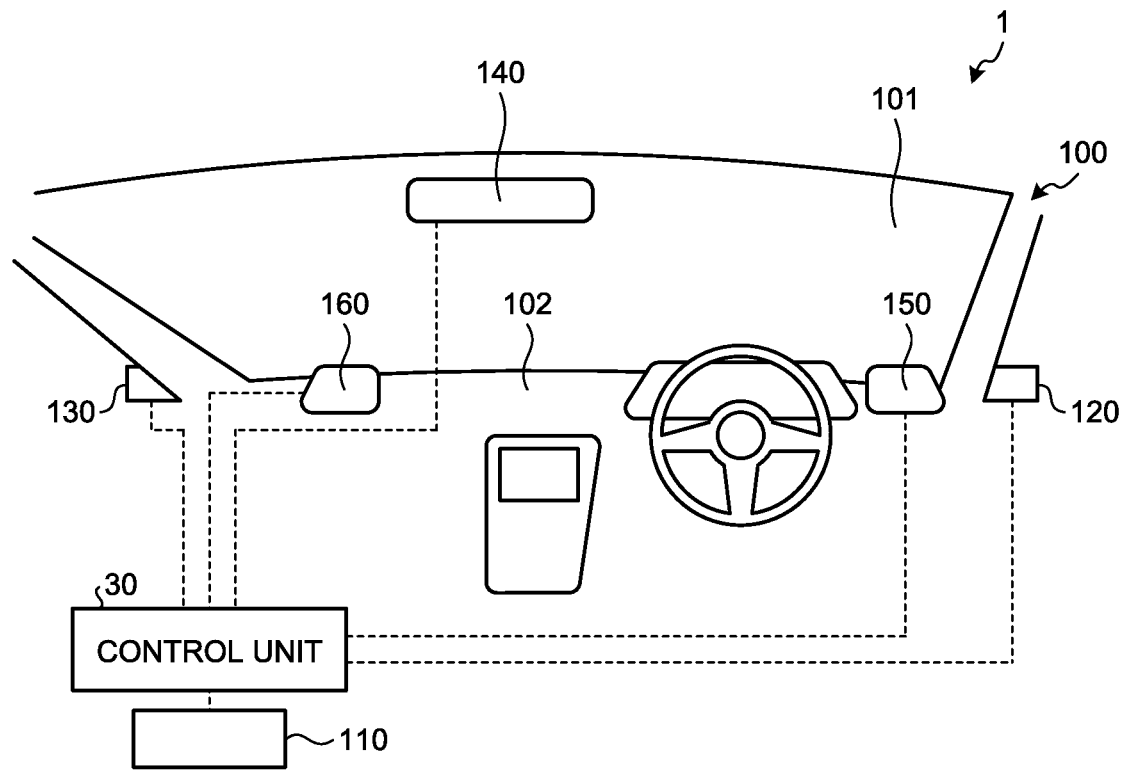
FIG. 1 is a schematic diagram illustrating a configuration example of an on-vehicle display system according to a first embodiment.
Figure 2:
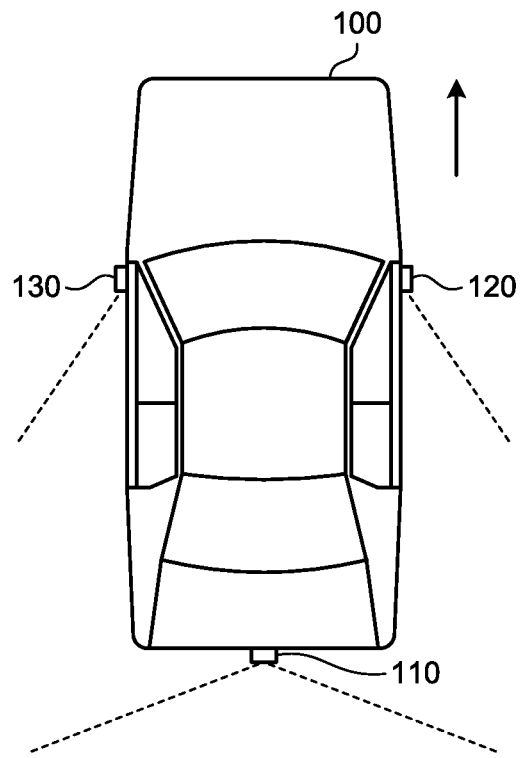
FIG. 2 is a schematic diagram illustrating a configuration example of the on-vehicle display system according to the first embodiment.
Figure 3:
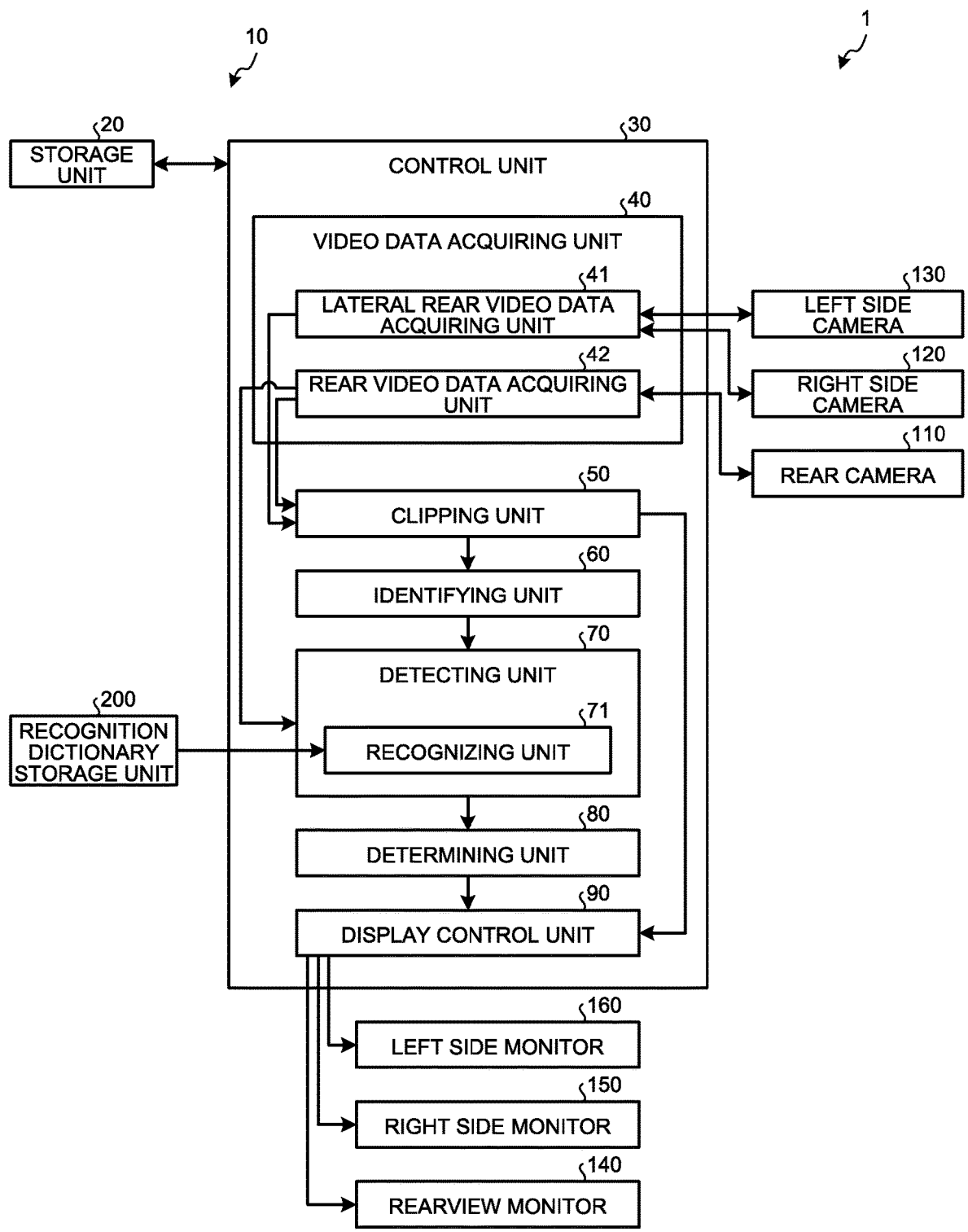
FIG. 3 is a block diagram illustrating a configuration example of the on-vehicle display system according to the first embodiment.

The on-vehicle display system 1 is mounted on a vehicle 100 and displays surroundings of the vehicle. FIG. 1 is a schematic diagram illustrating a configuration example of the on-vehicle display system according to a first embodiment. FIG. 2 is a schematic diagram illustrating a configuration example of the on-vehicle display system according to the first embodiment. FIG. 3 is a block diagram illustrating a configuration example of the on-vehicle display system according to the first embodiment.

As illustrated in FIG. 1 to FIG. 3, the on-vehicle display system 1 includes a rear camera 110, a right side camera (lateral rear camera) 120, a left side camera (lateral rear camera) 130, a rearview monitor 140, a right side monitor 150, a left side monitor 160, a recognition dictionary storage unit 200, and the on-vehicle display control device 10.

Figure 4:
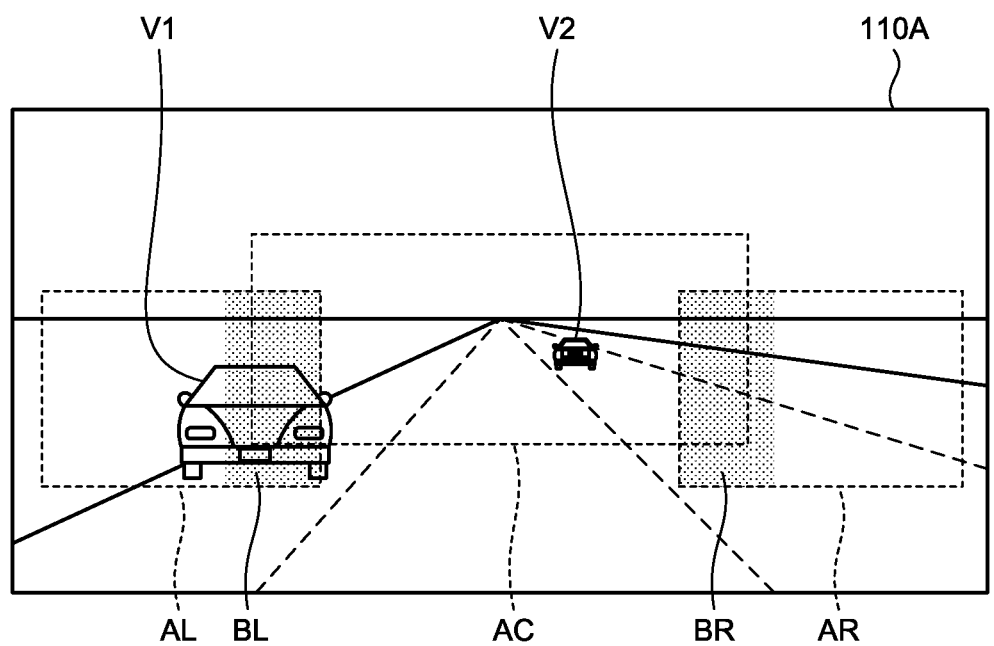
FIG. 4 is a diagram illustrating an example of video data captured by a rear camera of the on-vehicle display system according to the first embodiment.

The rear camera 110 is arranged on a rear part of the vehicle 100 and images a rear side of the vehicle 100. The rear camera 110 images an area including an area checked by the rearview monitor 140. The rear camera 110 images an area including blind spots of the right side camera 120 and the left side camera 130. A horizontal angle of view of the rear camera 110 is, for example, 90° to 180°, and a vertical angle of view of the rear camera 110 is, for example, 45° to 90°. Specifically, the rear camera 110 captures first video data 110A as illustrated in FIG. 4. FIG. 4 is a diagram illustrating an example of video data captured by the rear camera of the on-vehicle display system according to the first embodiment. The rear camera 110 is capable of capturing video in a wider area than the area displayed on the rearview monitor 140; however, the rear camera 110 clips a first area AC as an area that allows a driver of the vehicle 100 to appropriately recognize the rear side using the rearview monitor 140, and displays the first area AC on the rearview monitor 140. The first video data 110A includes the first area AC that is an area checked by the rearview monitor 140, and the second areas AR and AL that are areas checked by the right side monitor 150 and the left side monitor 160. The first area AC and the second area AR partially overlap with each other. The first area AC and the second area AL partially overlap with each other. The first video data 110A includes, on the lateral sides of the first area AC, a blind spot area BR corresponding to a blind spot of the right side camera 120 and a blind spot area BL corresponding to a blind spot of the left side camera 130. In the first embodiment, the first video data 110A further includes areas outside the first area AC, the second area AR, and the second area AL. In other words, the rear camera 110 normally captures an image including areas that are not displayed on the rearview monitor 140, the right side monitor 150, and the left side monitor 160. The rear camera 110 outputs the captured first video data 110A to a rear video data acquiring unit 42 of a video data acquiring unit 40 of the on-vehicle display control device 10.

The right side camera 120 is arranged on a right part of the vehicle 100 and images a right side of the vehicle 100. The right side camera 120 images an area checked by the right side monitor 150. A horizontal angle of view of the right side camera 120 is, for example, 15° to 45°, and a vertical angle of view of the right side camera 120 is, for example, 15° to 45°. The angle of the right side camera 120 is freely adjustable. The right side camera 120 outputs the captured video to a lateral rear video data acquiring unit 41 of the video data acquiring unit 40 of the on-vehicle display control device 10.

The left side camera 130 is arranged on a left part of the vehicle 100 and images a left side of the vehicle 100. The left side camera 130 images an area checked by the left side monitor 160. A horizontal angle of view of the left side camera 130 is, for example, 15° to 45°, and a vertical angle of view of the left side camera 130 is, for example, 15° to 45°. The angle of the left side camera 130 is freely adjustable. The left side camera 130 outputs the captured video to the lateral rear video data acquiring unit 41 of the video data acquiring unit 40 of the on-vehicle display control device 10.

Figure 5:
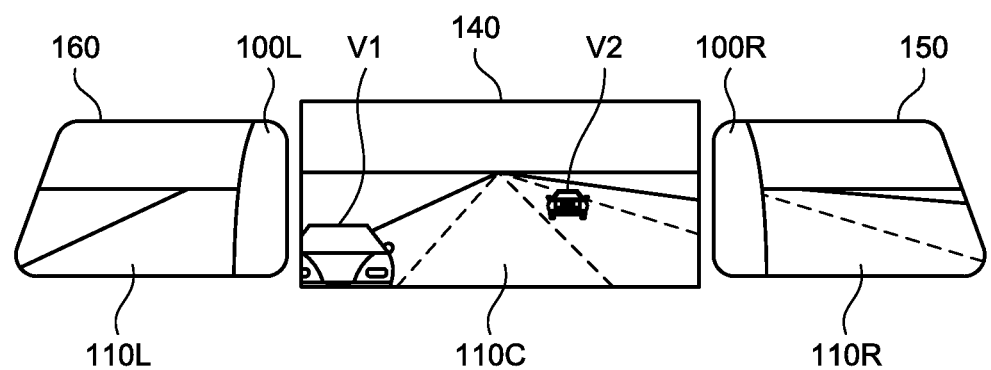
FIG. 5 is a diagram illustrating an example of video displayed on a rearview monitor, a right side monitor, and a left side monitor of the on-vehicle display system according to the first embodiment.

As one example, the rearview monitor 140 is an electronic rearview mirror. If the rearview monitor 140 is used as an electronic rearview mirror, it does not matter whether a half mirror for checking the rear side using optical reflection is provided or not. The rearview monitor 140 is, for example, a display including a liquid crystal display (LCD), an organic electro-luminescence (EL) display, or the like. The rearview monitor 140 displays video of the rear side of the vehicle 100 based on a video signal output from a display control unit 90 of the on-vehicle display control device 10. Specifically, the rearview monitor 140 displays rear video as illustrated in FIG. 5. FIG. 5 is a diagram illustrating an example of video displayed on the rearview monitor, the right side monitor, and the left side monitor of the on-vehicle display system according to the first embodiment. The rearview monitor 140 performs display in a manner partially overlapping with the right side monitor 150 and the left side monitor 160 on the lateral sides thereof. The rearview monitor 140 is arranged at a certain position so as to be easily viewed by the driver. In the first embodiment, the rearview monitor 140 is arranged in an upper central part of a windshield 101 in a vehicle-width direction.

The right side monitor 150 is, for example, a display including a liquid crystal display, an organic EL display, or the like. The right side monitor 150 displays video of the right rear side of the vehicle 100 based on a video signal output from the display control unit 90 of the on-vehicle display control device 10. Specifically, the right side monitor 150 displays right rear video as illustrated in FIG. 5. The right side monitor 150 has an area in which a right side body 100R of the vehicle 100 appears and rear visibility is limited. The right side monitor 150 is arranged at a certain position so as to be easily viewed by the driver. In the first embodiment, the right side monitor 150 is arranged on the right side of a dashboard 102 in the vehicle-width direction.

The left side monitor 160 is, for example, a display including a liquid crystal display, an organic EL display, or the like. The left side monitor 160 displays video of the left rear side of the vehicle 100 based on a video signal output from the display control unit 90 of the on-vehicle display control device 10. Specifically, the left side monitor 160 displays left rear video as illustrated in FIG. 5. The left side monitor 160 includes an area in which a left side body 100L of the vehicle 100 appears thereon and rear visibility is limited. The left side monitor 160 is arranged at a certain position so as to be easily viewed by the driver. More specifically, the left side monitor 160 is arranged on the left side of the dashboard 102 in the vehicle-width direction.

The recognition dictionary storage unit 200 stores therein, for example, a recognition dictionary that enables matching of patterns, such as shapes of front views or the like, sizes, and colors of moving objects including four-wheel vehicles, two-wheel vehicles, and persons. The recognition dictionary storage unit 200 is, for example, a semiconductor memory device, such as a random access memory (RAM), a read only memory (ROM), or a flash memory, or a storage device, such as a hard disk, an optical disk, or an external storage device over a network.

Referring back to FIG. 3, the on-vehicle display control device 10 includes a storage unit 20 and a control unit 30.

The storage unit 20 stores therein data needed for various processes performed in the on-vehicle display control device 10, and also stores therein results of the various processes. The storage unit 20 is, for example, a semiconductor memory device, such as a RAM, a ROM, or a flash memory, or a storage device, such as a hard disk, an optical disk, or an external storage device over a network.

The control unit 30 is, for example, an arithmetic processing device configured by a central processing unit (CPU) or the like. The control unit 30 includes the video data acquiring unit 40, a clipping unit 50, an identifying unit 60, a detecting unit 70, a determining unit 80, and the display control unit 90. The control unit 30 executes commands included in programs stored in the storage unit 20.

The video data acquiring unit 40 acquires video obtained by imaging the rear side and the lateral rear sides of the vehicle 100. The video data acquired by the video data acquiring unit 40 is, for example, video data including consecutive images at 120 frames per second. The video data acquiring unit 40 includes the lateral rear video data acquiring unit 41 and the rear video data acquiring unit 42. The lateral rear video data acquiring unit 41 acquires second video data output by the right side camera 120 and the left side camera 130. The lateral rear video data acquiring unit 41 outputs the acquired second video data to the clipping unit 50. The rear video data acquiring unit 42 acquires the first video data 110A output by the rear camera 110. The rear video data acquiring unit 42 outputs the acquired first video data 110A to the clipping unit 50 and the detecting unit 70.

The clipping unit 50 clips the first area AC, which is a part of the first video data 110A, from the first video data 110A. Information on a target area to be adopted as the first area AC in the first video data 110A is registered and stored in advance. In the first embodiment, a central portion of the first video data 110A is adopted as the first area AC. The clipping unit 50 outputs clipped rear video data 110C to the identifying unit 60 and the display control unit 90.

The clipping unit 50 clips, from the second video data, right rear video data 110R and left rear video data 110L in accordance with the right side monitor 150 and the left side monitor 160. The clipping unit 50 outputs the clipped right rear video data 110R and the clipped left rear video data 110L to the display control unit 90.

The identifying unit 60 identifies the second area AR, the second area AL, the blind spot area BR, and the blind spot area BL that are located on the lateral sides of the first area AC in the first video data 110A. More specifically, the identifying unit 60 identifies, as the second area AR and the second area AL, areas that are determined in advance as areas that match or substantially match imaging orientations of the right side camera 120 and the left side camera 130 or that match or substantially match the right rear video data 110R and the left rear video data 110L that are clipped from the second video data by the clipping unit 50. Further, the identifying unit 60 identifies, as the blind spot area BR and the blind spot area BL, areas that are determined in advance based on the imaging orientations of the right side camera 120 and the left side camera 130 or based on the right rear video data 110R and the left rear video data 110L that are clipped from the second video data by the clipping unit 50. As an alternative identification method, the identifying unit 60 may perform image matching based on the second video data and the first video data 110A, and identify the second area AR, the second area AL, the blind spot area BR, and the blind spot area BL in the first video data 110A as illustrated in FIG. 4. In this case, if the clipping unit 50 has performed a clipping process on the second video data, image matching is performed between the left rear video data 110L and the right rear video data 110R. The identifying unit 60 outputs, to the detecting unit 70, information on the second area AR, the second area AL, the blind spot area BR, and the blind spot area BL that are identified in the first video data 110A. The process performed by the identifying unit 60 is controlled by the control unit 30 so as to be performed when the angle of the rear camera 110, the right side camera 120, or the left side camera 130 is adjusted or when the rear camera 110, the right side camera 120, or the left side camera 130 is replaced.

As illustrated in FIG. 4, the identifying unit 60 may display frame borders representing the second area AR, the second area AL, the blind spot area BR, and the blind spot area BL together with the rear video data 110C on the rearview monitor 140, and make settings in accordance with operation performed by the driver or the like. Specifically, the driver or the like moves the frame borders to correct positions such that the right rear video data 110R displayed on the right side monitor 150 and the left rear video data 110L displayed on the left side monitor 160 match the frame borders displayed on the rearview monitor 140. The identifying unit 60 may identify the second area AR, the second area AL, the blind spot area BR, and the blind spot area BL in the first video data 110A in the manner as described above.

The detecting unit 70 detects a rear moving object V from the first video data 110A. The detecting unit 70 may detect a moving object in the whole first video data 110A and determine whether the detected moving object is present in the blind spot area BR or the blind spot area BL, or may detect a moving object in the blind spot area BR or the blind spot area BL. The detecting unit 70 includes a recognizing unit 71 that performs moving object recognition on the first video data 110A or on the blind spot area BR or the blind spot area BL of the first video data 110A and that recognizes the rear moving object V. The recognizing unit 71 performs pattern matching on the first video data 110A or on the blind spot area BR or the blind spot area BL of the first video data 110A using the recognition dictionary stored in the recognition dictionary storage unit 200, and detects presence of the rear moving object V. The recognizing unit 71 recognizes whether a rear moving object V1 is located close to or away from the vehicle 100 based on a change in the size of the rear moving object V1 in each of the frames in the first video data 110A. The detecting unit 70 outputs a detection result to the display control unit 90.

The determining unit 80 determines whether the rear moving object V detected by the detecting unit 70 is present in the blind spot area BR or the blind spot area BL. Specifically, in a case of the first video data 110A illustrated in FIG. 4, it is determined that the rear moving object V1 is present in the blind spot area BL.

The display control unit 90 causes the rearview monitor 140 to display the rear video data 110C as a normal display process that is performed in normal times. The display control unit 90 causes the right side monitor 150 to display the first right rear video data 110R as the normal display process that is performed in normal times. In other words, in normal times, the display control unit 90 causes the right side monitor 150 to display the first right rear video data 110R that is based on the second video data captured by the right side camera 120. The display control unit 90 causes the left side monitor 160 to display the first left rear video data 110L as the normal display process that is performed in normal times. In other words, in normal times, the display control unit 90 causes the left side monitor 160 to display the first left rear video data 110L that is based on the second video data captured by the left side camera 130.

The display control unit 90 determines whether a predetermined condition is satisfied for each frame or for each predetermined frame, and if the predetermined condition is satisfied, the display control unit 90 performs a blind spot display process that causes the right side monitor 150 and the left side monitor 160 to additionally display the blind spot area BR or the blind spot area BL. More specifically, if the determining unit 80 determines that the rear moving object V is present in the blind spot area BR or the blind spot area BL, the display control unit 90 causes the right side monitor 150 and the left side monitor 160 to display second right rear video data 110R2 (see FIG. 7) and second left rear video data 110L2 (see FIG. 7), which are clipped from the first video data 110A. If the rear moving object V moves away from the blind spot area BR or the blind spot area BL of the first video data 110A, the display control unit 90 returns the right side monitor 150 and the left side monitor 160 to normal display.

Even in a case where the rear moving object V is detected in the blind spot area BR or the blind spot area BL of the first video data 110A, if a small part of the rear moving object V is present in the blind spot area BR or the blind spot area BL (if only the small part appears), the display control unit 90 may maintain the normal display on the right side monitor 150 and the left side monitor 160. Specifically, for example, when an area of the rear moving object V that has appeared in the blind spot area BR or the blind spot area BL is equal to or smaller than half of an area of the whole rear moving object V that may appear in the same area, it may be possible to maintain the normal display.

Figure 6:
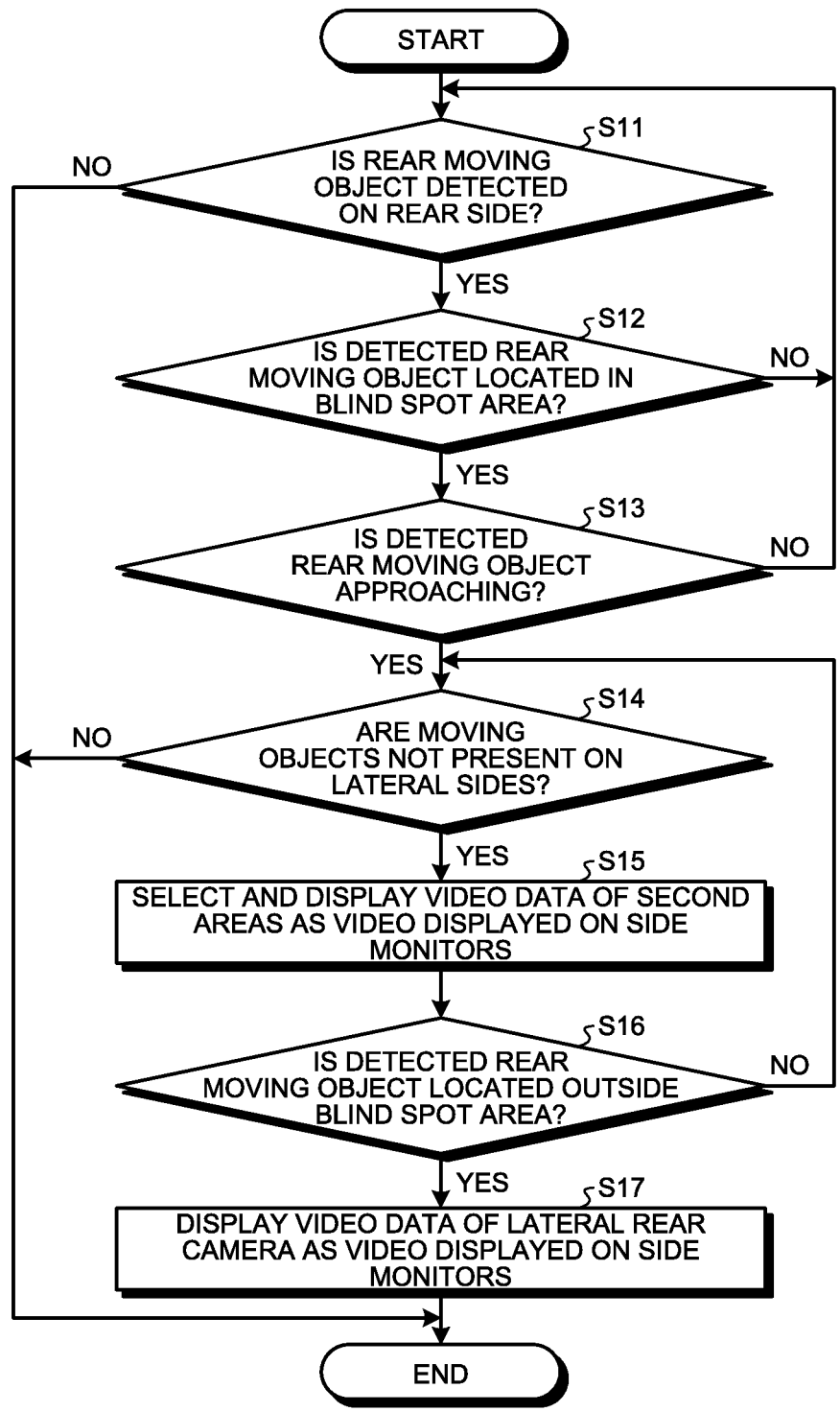
FIG. 6 is a flowchart illustrating the flow of a process performed by a display control unit of an on-vehicle display control device of the on-vehicle display system according to the first embodiment.

Next, with reference to FIG. 6, the flow of the blind spot display process performed by the display control unit 90 will be described. FIG. 6 is a flowchart illustrating the flow of the process performed by the display control unit of the on-vehicle display control device of the on-vehicle display system according to the first embodiment.

The display control unit 90 determines whether the rear moving object V or a part of the rear moving object V (hereinafter, described as the rear moving object V) is detected on the rear side of the vehicle 100 (Step S11). More specifically, the display control unit 90 determines whether the detecting unit 70 has detected the rear moving object V in the first video data 110A.

If the display control unit 90 determines that the rear moving object V is not detected on the rear side of the vehicle 100 (No at Step S11), the process ends.

If the display control unit 90 determines that the rear moving object V is detected on the rear side of the vehicle 100 (Yes at Step S11), the process proceeds to Step S12.

The display control unit 90 determines whether a position of the detected rear moving object V is located in the blind spot area BR or the blind spot area BL of the first video data 110A (Step S12). More specifically, the display control unit 90 determines whether the detecting unit 70 has detected the rear moving object V present in the blind spot area BR or the blind spot area BL of the first video data 110A.

If the display control unit 90 determines that the position of the detected rear moving object V is not located in the blind spot area BR or the blind spot area BL of the first video data 110A (No at Step S12), the process returns to Step S11 and the process is repeated.

If the display control unit 90 determines that the position of the detected rear moving object V is located in the blind spot area BR or the blind spot area BL of the first video data 110A (Yes at Step S12), the process proceeds to Step S13.

The display control unit 90 determines whether the detected rear moving object V is approaching the vehicle 100 (Step S13). More specifically, for example, the display control unit 90 determines whether the detecting unit 70 has detected that the rear moving object V is located close to the vehicle 100.

If the display control unit 90 determines that the detected rear moving object V is not approaching the vehicle 100 (No at Step S13), the process returns to Step S11 and the process is repeated.

If the display control unit 90 determines that the detected rear moving object V is approaching the vehicle 100 (Yes at Step S13), the process proceeds to Step S14.

The display control unit 90 determines whether moving objects are present on the lateral sides of the vehicle 100 (Step S14). More specifically, the display control unit 90 compares portions except for portions in which the right side body 100R and the left side body 100L appear in the second video data with corresponding portions in the first video data 110A, and if there are differences, the display control unit 90 determines that moving objects are present on the lateral sides of the vehicle 100. In this manner, the display control unit 90 detects a moving object that is present on the lateral side of the vehicle 100, which is imaged by only the right side camera 120 or the left side camera 130, but not imaged by the rear camera 110.

If the display control unit 90 determines that moving objects are not present on the lateral sides of the vehicle 100 (No at Step S14), the process ends.

If the display control unit 90 determines that moving objects are present on the lateral sides of the vehicle 100 (Yes at Step S14), the process proceeds to Step S15.

The display control unit 90 causes the right side monitor 150 and the left side monitor 160 to display the second right rear video data 110R2 and the second left rear video data 110L2, which are clipped from the first video data 110A (Step S15). More specifically, the display control unit 90 causes the clipping unit 50 to clip, as the second right rear video data 110R2 and the second left rear video data 110L2, the first area AC and the second area AR that are located on the lateral sides of the first area AC in the first video data 110A. Then, the display control unit 90 causes the right side monitor 150 and the left side monitor 160 to display the clipped second right rear video data 110R2 and the clipped second left rear video data 110L2.

The display control unit 90 determines whether the position of the rear moving object V is located outside the blind spot area BR or the blind spot area BL of the first video data 110A (Step S16). More specifically, the display control unit 90 determines whether the detecting unit 70 has detected that the position of the rear moving object V is located outside the blind spot area BR or the blind spot area BL of the first video data 110A.

If the display control unit 90 determines that the position of the rear moving object V is not located outside the blind spot area BR or the blind spot area BL of the first video data 110A (No at Step S16), the process returns to Step S14 and the process is repeated.

If the display control unit 90 determines that the position of the rear moving object V is located outside the blind spot area BR or the blind spot area BL of the first video data 110A (Yes at Step S16), the process proceeds to Step S17.

The display control unit 90 performs normal display on the right side monitor 150 and the left side monitor 160 (Step S17). More specifically, the display control unit 90 causes the right side monitor 150 and the left side monitor 160 to display the second right rear video data 110R2 and the second left rear video data 110L2 that are clipped from the first video data 110A.

The display control unit 90 may change a determination condition for determining whether the detected rear moving object V is present in the blind spot area BR or the blind spot area BL of the first video data 110A, depending on a distance between the vehicle 100 and the rear moving object V. For example, if the distance to the detected rear moving object V is short, it is determined that the rear moving object V is present when the area of the rear moving object V that has appeared in the blind spot area BR or the blind spot area BL is equal to or greater than 25% of the area of the whole moving object V that may appear in the same area. Further, if the distance to the detected rear moving object V is long, it is determined that the rear moving object V is present when the area of the rear moving object V that has appeared in the blind spot area BR or the blind spot area BL is equal to or greater than 75% of the area of the whole moving object V that may appear in the same area. The distance between the vehicle 100 and the detected rear moving object V can be obtained by identifying a ground contact position that is based on the contour of the detected rear moving object V when the recognizing unit 71 detects the rear moving object V from the first video data 110A, and then using a positional relationship of the ground contact position in the first video data 110A. Specifically, if the distance from the vehicle 100 to the rear moving object V is equal to or longer than 100 meters (m), it is determined that the rear moving object V is present when the area of the rear moving object V that has appeared in the blind spot area BR or the blind spot area BL is equal to or greater than 75% of the area of the whole moving object V that may appear in the same area. Further, if the distance from the vehicle 100 to the rear moving object V is equal to or longer than 50 m and shorter than 100 m, it is determined that the rear moving object V is present when the area of the rear moving object V that has appeared in the blind spot area BR or the blind spot area BL is equal to or greater than 50% of the area of the whole moving object V that may appear in the same area. Furthermore, if the distance from the vehicle 100 to the rear moving object V is shorter than 50 m, it is determined that the rear moving object V is present when the area of the rear moving object V that has appeared in the blind spot area BR or the blind spot area BL is equal to or greater than 25% of the area of the whole moving object V that may appear in the same area.

With reference to FIG. 4, a concrete example of the blind spot display process performed by the display control unit 90 will be described. It is assumed that the rear moving object V1 is approaching the vehicle 100. At Step S11, the display control unit 90 determines that the rear moving object V1 and a rear moving object V2 are detected in the first video data 110A (Yes at Step S11). Subsequently, the display control unit 90 determines that the position of the rear moving object V1 is located in the blind spot area BL of the first video data 110A (Yes at Step S12). Then, it is determined that the rear moving object V1 is approaching (Yes at Step S13). Subsequently, it is determined that moving objects are not present on the lateral sides of the vehicle 100 (Yes at Step S14). Then, at Step S15, the display control unit 90 causes the left side monitor 160 to display the second left rear video data 110L2.

Figure 7:
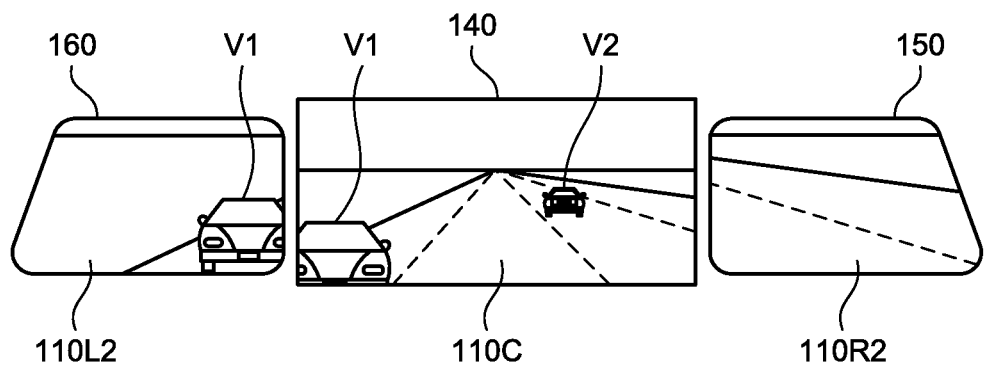
FIG. 7 is a diagram illustrating another example of video displayed on the rearview monitor, the right side monitor, and the left side monitor of the on-vehicle display system according to the first embodiment.

Specifically, as illustrated in FIG. 7, the display control unit 90 causes the left side monitor 160 to display the second left rear video data 110L2 in which the rear moving object V1 appears, and the right side monitor 150 to display the second right rear video data 110R2. FIG. 7 is a diagram illustrating another example of video displayed on the rearview monitor, the right side monitor, and the left side monitor of the on-vehicle display system according to the first embodiment.

Figure 8:
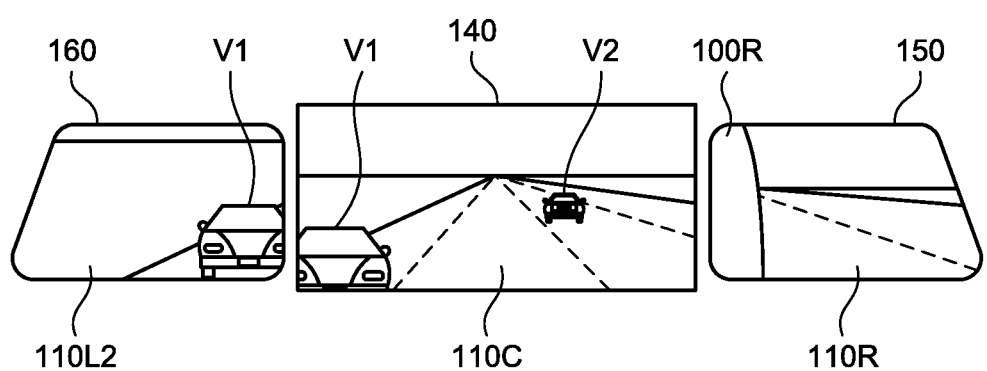
FIG. 8 is a diagram illustrating still another example of video displayed on the rearview monitor, the right side monitor, and the left side monitor of the on-vehicle display system according to the first embodiment.

Alternatively, as illustrated in FIG. 8, the display control unit 90 may cause the left side monitor 160 to display the second left rear video data 110L2 in which the rear moving object V1 appears, and the right side monitor 150 to display the first right rear video data 110R, which is the normal display. FIG. 8 is a diagram illustrating another example of video displayed on the rearview monitor, the right side monitor, and the left side monitor of the on-vehicle display system according to the first embodiment.

In this manner, when the display control unit 90 detects the rear moving object V in the blind spots of the right side camera 120 and the left side camera 130, the on-vehicle display system 1 causes the right side monitor 150 and the left side monitor 160 to display the second right rear video data 110R2 and the second left rear video data 110L2.

As described above, when the rear moving object V is present in the blind spots of the right side camera 120 and the left side camera 130, the on-vehicle display system 1 according to the first embodiment causes the right side monitor 150 and the left side monitor 160 to display the second right rear video data 110R2 and the second left rear video data 110L2, which are clipped from the first video data 110A. In this manner, even when the rear moving object V is present in the blind spots of the right side camera 120 and the left side camera 130, the on-vehicle display system 1 can cause the right side monitor 150 and the left side monitor 160 to display the rear moving object V. Therefore, the on-vehicle display system 1 can appropriately display the rear moving object V. Consequently, the on-vehicle display system 1 can appropriately check surroundings of the vehicle 100.

Second Embodiment

With reference to FIG. 9 to FIG. 13, an on-vehicle display system according to a second embodiment will be described. A basic configuration of the on-vehicle display system is the same as that of the on-vehicle display system 1 of the first embodiment. In the following descriptions, the same components as those of the on-vehicle display system 1 will be denoted by the same reference signs or corresponding reference signs, and detailed explanation thereof will be omitted. The on-vehicle display system according to the second embodiment is different from the on-vehicle display system 1 in that a control unit performs processes different from the processes performed by the control unit 30.

A detecting unit detects a moving direction of the rear moving object V. The detecting unit detects the moving direction of the rear moving object V based on a change in the position of the rear moving object V in each of the frames in the first video data 110A.

A determining unit determines whether the detected rear moving object V is moving from the first area AC to the blind spot area BR or the blind spot area BL.

If the determining unit determines that the detected rear moving object V is moving from the first area AC, the second area AR, or the second area AL to the blind spot area BR or the blind spot area BL, a display control unit causes the right side monitor 150 or the left side monitor 160 to display second right rear video data 110R3 or second left rear video data 110L3.

Figure 9:
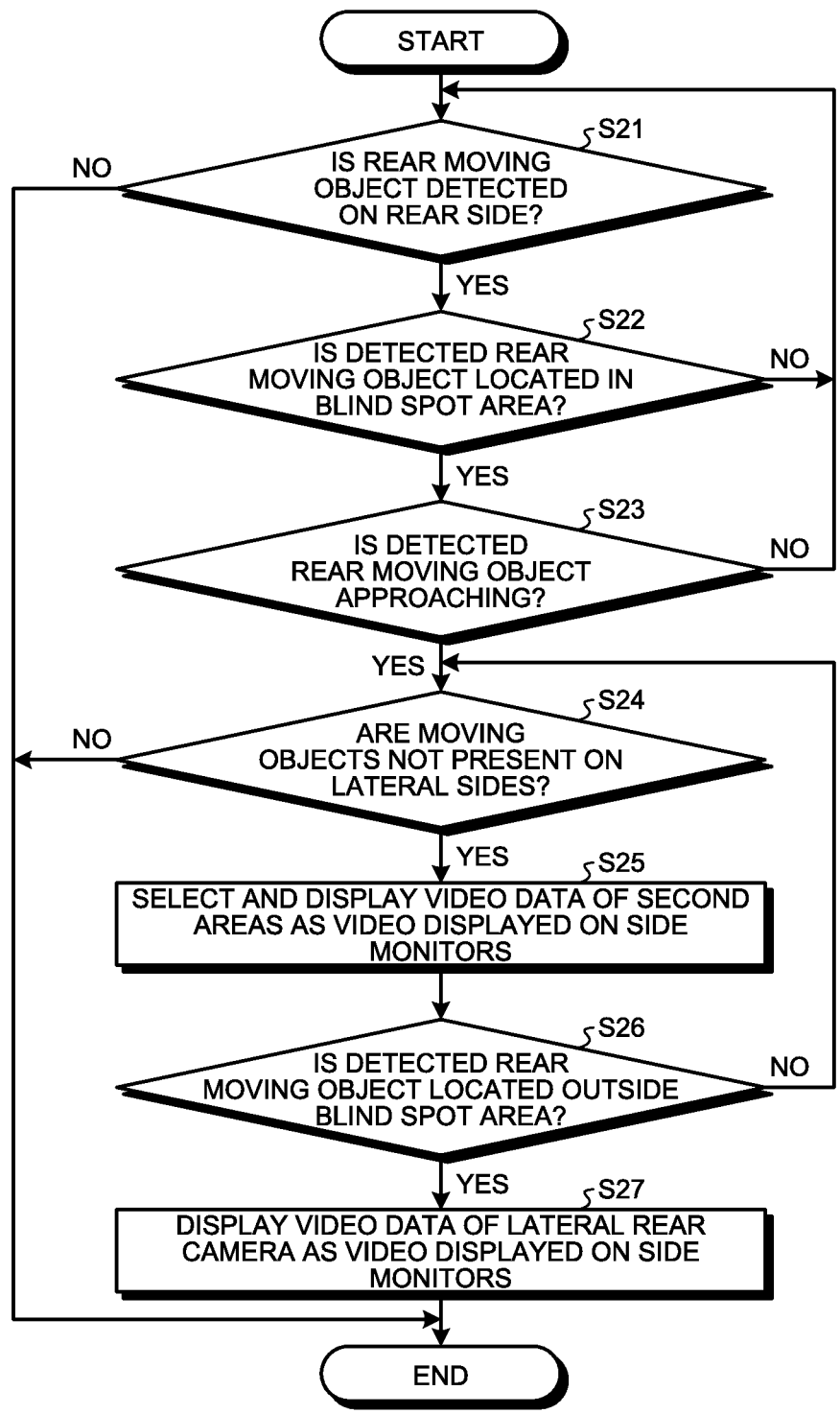
FIG. 9 is a flowchart illustrating the flow of a process performed by an on-vehicle display control device of an on-vehicle display system according to a second embodiment.

With reference to FIG. 9, the flow of a process performed by an on-vehicle display control device of the on-vehicle display system will be described. FIG. 9 is a flowchart illustrating the flow of the process performed by the on-vehicle display control device of the on-vehicle display system according to the second embodiment.

The display control unit performs processes at Step S21 to Step S27. The processes at Step S21 and Step S23 are respectively the same as the processes at Step S11 and Step S13 in the flowchart illustrated in FIG. 6, and the processes at Step S24 to Step S27 are respectively the same as the processes at Step S14 to Step S17 in the flowchart illustrated in FIG. 6.

The display control unit determines whether the rear moving object V is moving from the first area AC, the second area AR, or the second area AL to the blind spot area BR or the blind spot area BL (Step S22). More specifically, the display control unit determines whether the detecting unit has detected that the rear moving object V is moving from the first area AC, the second area AR, or the second area AL to the blind spot area BR or the blind spot area BL.

If the display control unit determines that the rear moving object V is not moving from the first area AC, the second area AR, or the second area AL to the blind spot area BR or the blind spot area BL (No at Step S22), the process returns to Step S21 and the process is repeated.

If the display control unit determines that the rear moving object V is moving from the first area AC, the second area AR, or the second area AL to the blind spot area BR or the blind spot area BL (Yes at Step S22), the process proceeds to Step S23.

Figure 10:
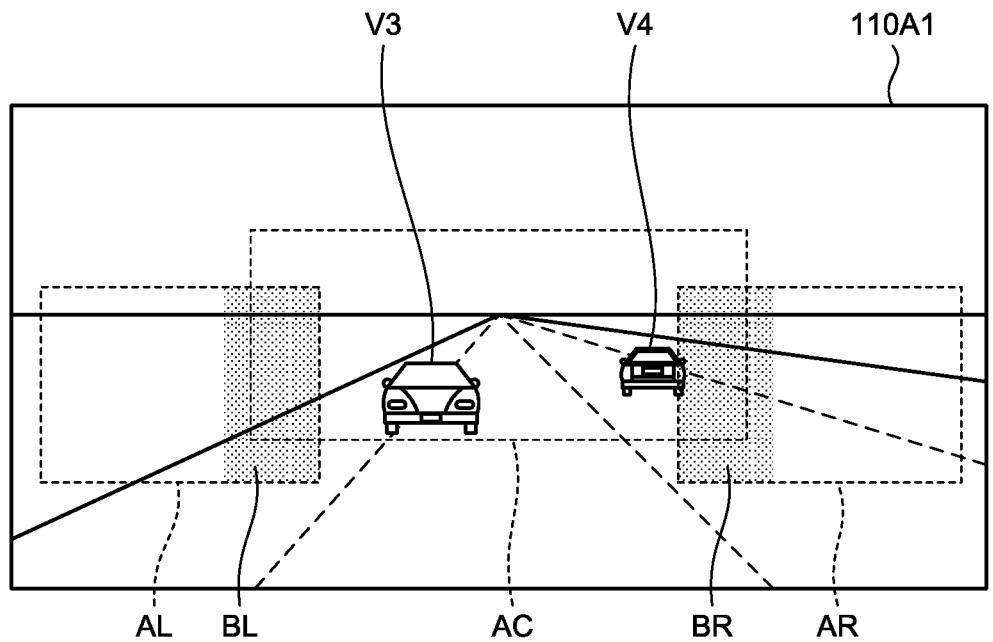
FIG. 10 is a diagram illustrating an example of video data captured by a rear camera of the on-vehicle display system according to the second embodiment.
Figure 11:
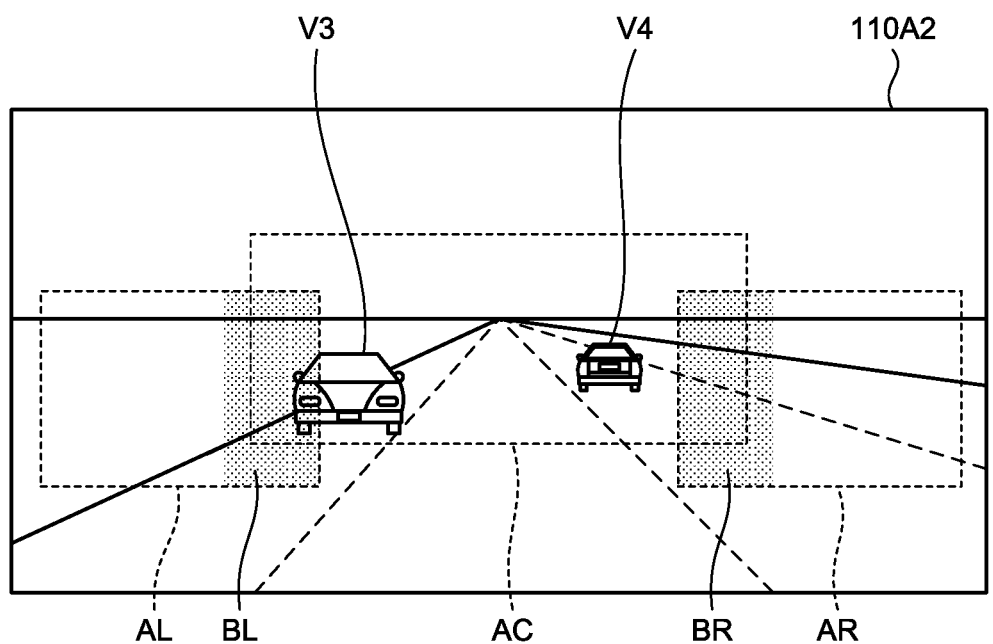
FIG. 11 is a diagram illustrating another example of video data captured by the rear camera of the on-vehicle display system according to the second embodiment.

With reference to FIG. 10 and FIG. 11, a concrete example of the blind spot display process performed by the display control unit will be described. FIG. 10 is a diagram illustrating an example of video data captured by a rear camera of the on-vehicle display system according to the second embodiment. FIG. 11 is a diagram illustrating another example of video data captured by the rear camera of the on-vehicle display system according to the second embodiment. FIG. 11 illustrates a state obtained slightly after a state illustrated in FIG. 10. It is assumed that a rear moving object V3 is moving from the first area AC to the blind spot area BL and a rear moving object V4 is receding from the vehicle 100 as displayed in first video data 110A1 and first video data 110A2. At Step S21, the display control unit determines that the rear moving objects V3 and V4 are detected in the first video data 110A1 (Yes at Step S21). Subsequently, the display control unit determines that the rear moving object V3 is moving from the first area AC to the blind spot area BL (Yes at Step S22). Then, it is determined that the rear moving object V3 is approaching (Yes at Step S23). Subsequently, it is determined that moving objects are not present on the lateral sides of the vehicle 100 (Yes at Step S24). Then, at Step S25, the display control unit causes the left side monitor 160 to display the second left rear video data 110L3.

Figure 12:
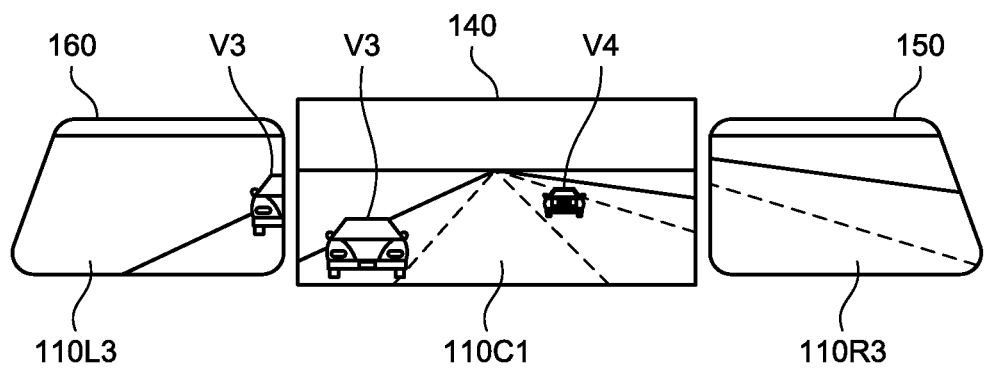
FIG. 12 is a diagram illustrating an example of video displayed on a rearview monitor, a right side monitor, and a left side monitor of the on-vehicle display system according to the second embodiment.

Specifically, as illustrated in FIG. 12, the display control unit causes the left side monitor 160 to display the second left rear video data 110L3 in which the rear moving object V3 appears, and the right side monitor 150 to display the second right rear video data 110R3. FIG. 12 is a diagram illustrating an example of video displayed on the rearview monitor, the right side monitor, and the left side monitor of the on-vehicle display system according to the second embodiment.

Figure 13:
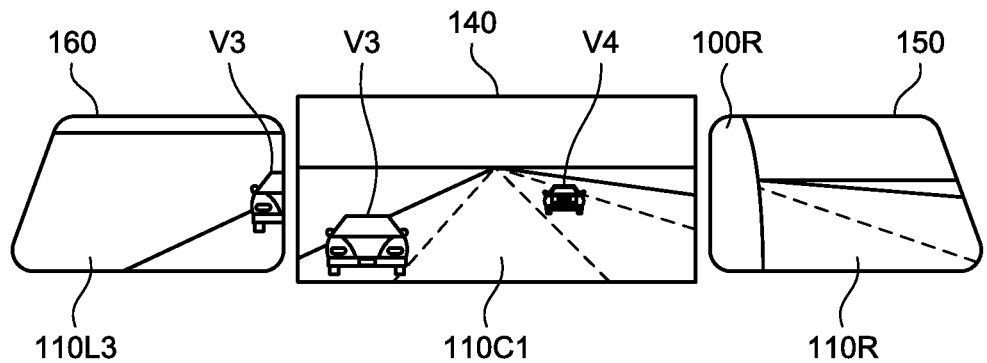
FIG. 13 is a diagram illustrating another example of video displayed on the rearview monitor, the right side monitor, and the left side monitor of the on-vehicle display system according to the second embodiment.

Alternatively, as illustrated in FIG. 13, the display control unit may cause the left side monitor 160 to display the second left rear video data 110L3 in which the rear moving object V3 appears, and the right side monitor 150 to display the first right rear video data 110R, which is the normal display. FIG. 13 is a diagram illustrating another example of video displayed on the rearview monitor, the right side monitor, and the left side monitor of the on-vehicle display system according to the second embodiment.

In this manner, when the display control unit detects the rear moving object V moving to the blind spot area BR or the blind spot area BL, the on-vehicle display system 1 causes the right side monitor 150 and the left side monitor 160 to display the second right rear video data 110R3 and the second left rear video data 110L3.

As described above, when the rear moving object V moving to the blind spot area BR or the blind spot area BL is detected, the on-vehicle display system according to the second embodiment causes the right side monitor 150 or the left side monitor 160 to display the second right rear video data 110R3 or the second left rear video data 110L3, which is clipped from the first video data 110A. Therefore, the on-vehicle display system 1 can appropriately display the rear moving object V. Consequently, the on-vehicle display system 1 can appropriately check surroundings of the vehicle 100.

Third Embodiment

Figure 14:
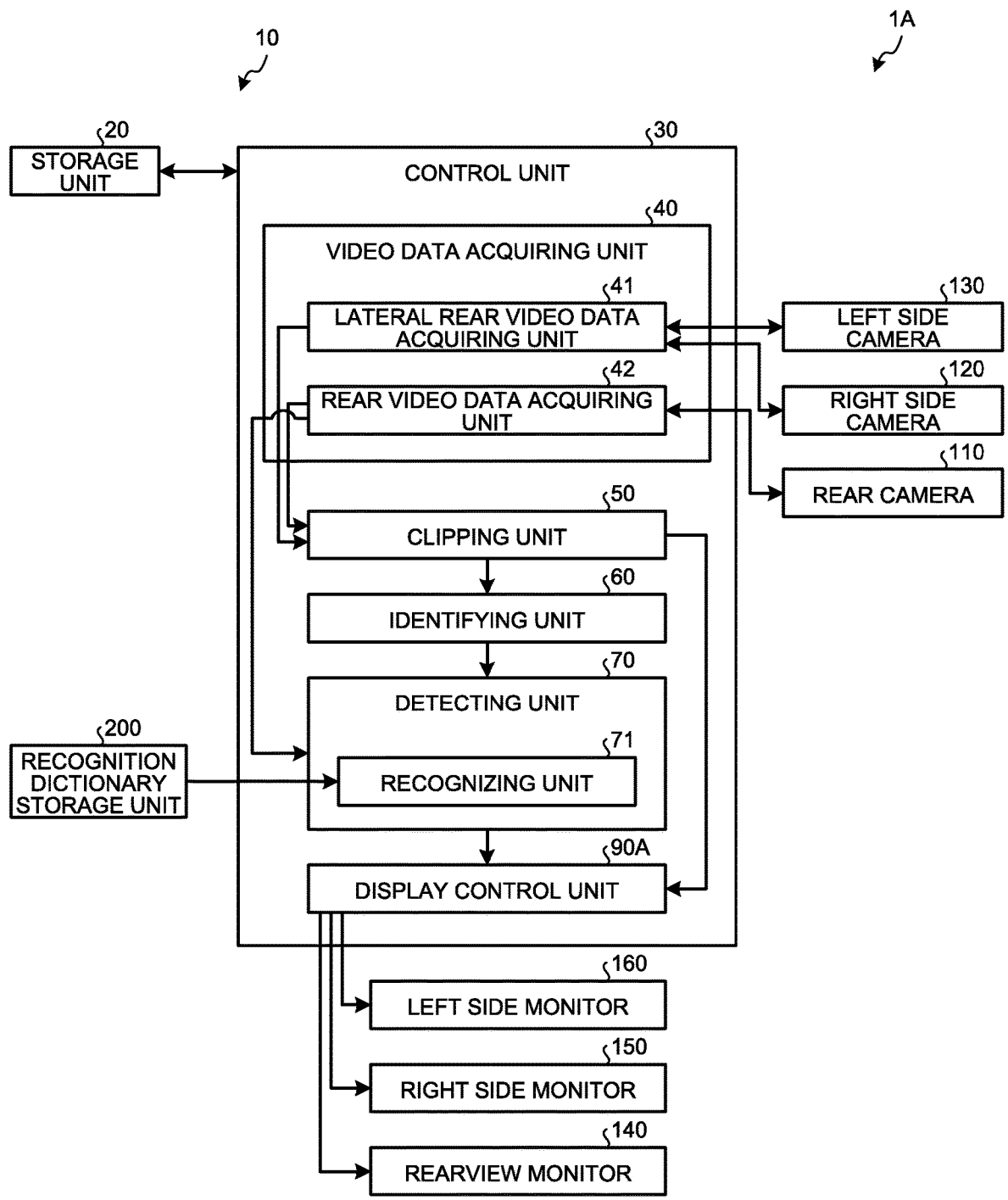
FIG. 14 is a block diagram illustrating a configuration example of an on-vehicle display system according to a third embodiment.

With reference to FIG. 14 to FIG. 21, an on-vehicle display system 1A according to a third embodiment will be described. FIG. 14 is a block diagram illustrating a configuration example of an on-vehicle display system according to the third embodiment.

Figure 15:
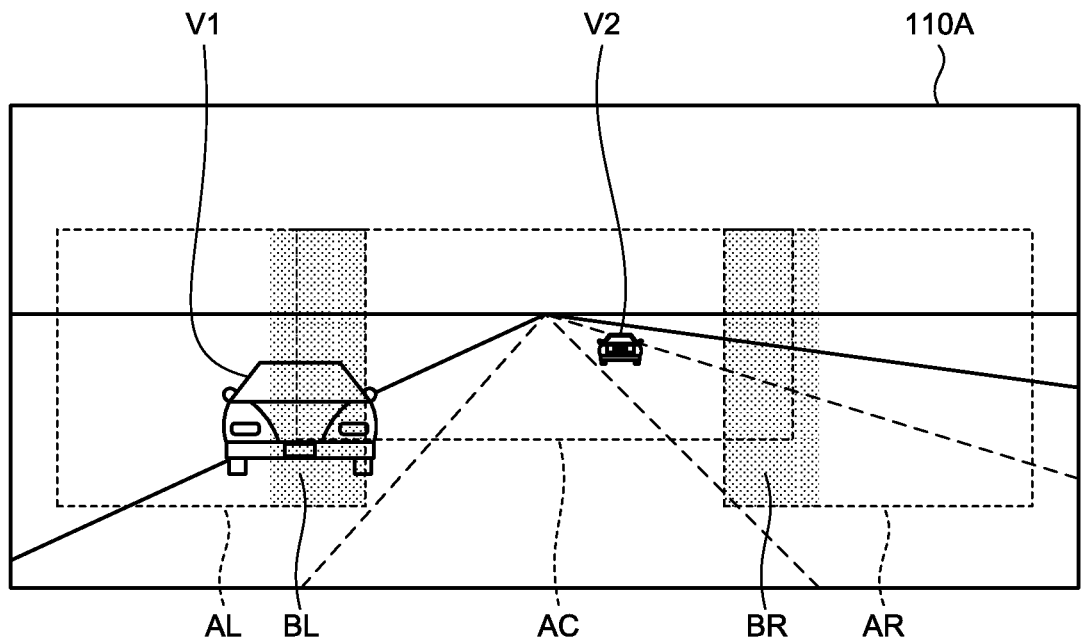
FIG. 15 is a diagram illustrating an example of video data captured by a rear camera of the on-vehicle display system according to the third embodiment.

Specifically, the rear camera 110 captures the first video data 110A as illustrated in FIG. 15. FIG. 15 is a diagram illustrating an example of video data captured by a rear camera of an on-vehicle display system according to the third embodiment. The first video data 110A includes at least a part of the first area AC that is an area checked by the rearview monitor 140, and the second areas AR and AL that are areas checked by the right side monitor 150 and the left side monitor 160.

Referring back to FIG. 14, the on-vehicle display control device 10 includes the storage unit 20 and the control unit 30.

The control unit 30 includes the video data acquiring unit 40, the clipping unit 50, the identifying unit 60, the detecting unit 70, and a display control unit 90A.

The clipping unit 50 outputs the clipped rear video data 110C to the identifying unit 60 and the display control unit 90A.

The detecting unit 70 detects a moving direction of the rear moving object V based on a change in the position of the rear moving object V recognized by the recognizing unit 71 in each of the frames in the first video data 110A. When the detecting unit 70 detects the moving direction of the rear moving object V, if the rear moving object V has a license plate, the detecting unit 70 may read alphanumeric characters and signs on the license plate and detect the moving direction of the rear moving object V using the read alphanumeric characters and signs.

The display control unit 90A causes the right side monitor 150 to display the right rear video data 110R as a normal display process that is performed in normal times. In other words, in normal times, the display control unit 90A causes the right side monitor 150 to display the right rear video data 110R that is based on the second video data captured by the right side camera 120. The display control unit 90A causes the left side monitor 160 to display the left rear video data 110L as the normal display process that is performed in normal times. In other words, in normal times, the display control unit 90A causes the left side monitor 160 to display the left rear video data 110L that is based on the second video data captured by the left side camera 130.

The display control unit 90A determines whether a predetermined condition is satisfied for each frame or for each predetermined frame, and if the predetermined condition is satisfied, the display control unit 90A performs a blind spot display process that causes the rearview monitor 140 to additionally display the blind spot area BR or the blind spot area BL. Specifically, if the detecting unit 70 detects the rear moving object V in the blind spot area BR or the blind spot area BL of the first video data 110A, the display control unit 90A causes the rearview monitor 140 to display the blind spot area BR or the blind spot area BL in addition to the first area AC. More specifically, based on information indicating the blind spot area BR or the blind spot area BL as an area in which the rear moving object V is detected by the detecting unit 70, the display control unit 90A causes the rearview monitor 140 to additionally display the blind spot area BR or the blind spot area BL corresponding to the side on which the rear moving object V is detected on a display screen of the rearview monitor 140. The display control unit 90A displays the blind spot area BR or the blind spot area BL in addition to the first area AC by changing a clipping area of the first area AC. If the rear moving object V moves away from the blind spot area BR or the blind spot area BL of the first video data 110A, the display control unit 90A returns the rearview monitor 140 to normal display.

Even in a case where the rear moving object V is detected in the blind spot area BR or the blind spot area BL of the first video data 110A, if a small part of the rear moving object V is present in the blind spot area BR or the blind spot area BL (if only the small part appears), the display control unit 90A may maintain the normal display on the rearview monitor 140. For example, when an area of the rear moving object V that has appeared in the blind spot area BR or the blind spot area BL is equal to or smaller than a predetermined percent of an area of the whole rear moving object V that may appear in the same area, the display control unit 90A may maintain the normal display on the rearview monitor 140.

Figure 16:
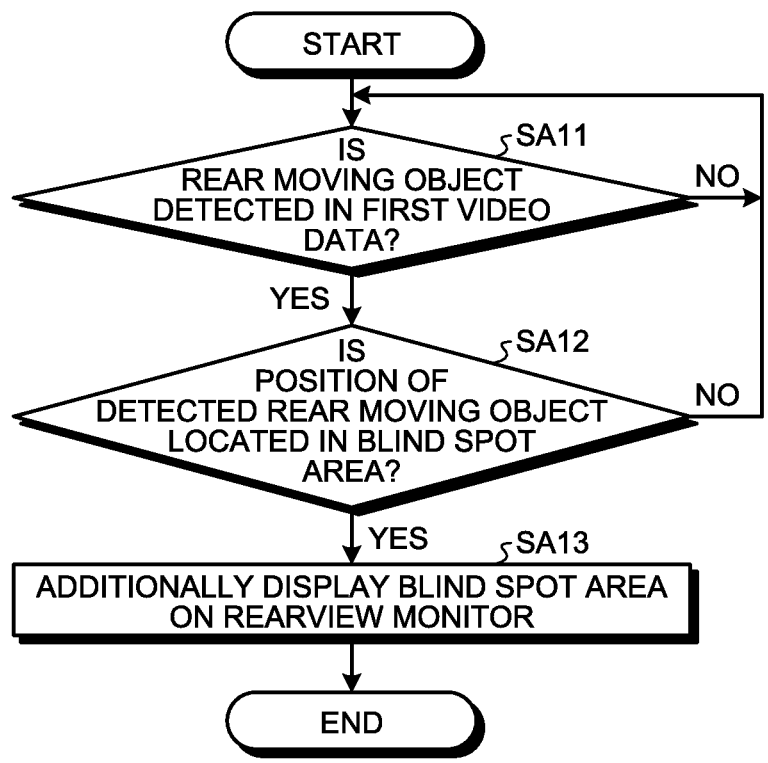
FIG. 16 is a flowchart illustrating the flow of a process performed by a display control unit of an on-vehicle display control device of the on-vehicle display system according to the third embodiment.

Next, with reference to FIG. 16, the flow of the blind spot display process performed by the display control unit 90A will be described. FIG. 16 is a flowchart illustrating the flow of the process performed by the display control unit of the on-vehicle display control device of the on-vehicle display system according to the third embodiment.

The display control unit 90A determines whether the rear moving object V is detected in the first video data 110A (Step SA11). More specifically, the display control unit 90A determines whether the detecting unit 70 has detected the rear moving object V in the first video data 110A.

If the display control unit 90A determines that the rear moving object V is not detected in the first video data 110A (No at Step SA11), the process at Step SA11 is repeated.

If the display control unit 90A determines that the rear moving object V is detected in the first video data 110A (Yes at Step SA11), the process proceeds to Step SA12.

The display control unit 90A determines whether the detected rear moving object V or a part of the detected rear moving object V (hereinafter, described as the rear moving object V) is present in the blind spot area BR or the blind spot area BL of the first video data 110A (Step SA12). More specifically, the display control unit 90A determines whether the detecting unit 70 has detected the rear moving object V present in the blind spot area BR or the blind spot area BL of the first video data 110A.

If the display control unit 90A determines that the detected rear moving object V is not present in the blind spot area BR or the blind spot area BL of the first video data 110A (No at Step SA12), the process returns to Step SA11 and the process is repeated.

If the display control unit 90A determines that the detected rear moving object V is present in the blind spot area BR or the blind spot area BL of the first video data 110A (Yes at Step SA12), the process proceeds to Step SA13.

The display control unit 90A causes the rearview monitor 140 to display the blind spot area BR or the blind spot area BL in addition to the first area AC (Step SA13). More specifically, based on information indicating the blind spot area BR or the blind spot area BL as an area in which the rear moving object V is detected by the detecting unit 70, the display control unit 90A causes the rearview monitor 140 to additionally display the blind spot area BR or the blind spot area BL corresponding to the side on which the rear moving object V is detected. More specifically, the display control unit 90A causes the clipping unit 50 to change a clipping area of the first area AC so as to include the blind spot area BR or the blind spot area BL. The clipping area of the first area AC to be changed may be set such that the rear video data 110C is gradually extended in accordance with movement of the rear moving object V, or may be set such that the rear video data 110C is extended to a certain area that is set in advance. Then, the display control unit 90A causes the rearview monitor 140 to display the clipped rear video data 110C.

The display control unit 90A may change a determination condition for determining whether the detected rear moving object V is present in the blind spot area BR or the blind spot area BL of the first video data 110A, depending on a distance between the vehicle 100 and the rear moving object V. For example, if the distance to the detected rear moving object V is short, it is determined that the rear moving object V is present when the area of the rear moving object V that has appeared in the blind spot area BR or the blind spot area BL is equal to or greater than 25% of the area of the whole moving object V that may appear in the same area. Further, if the distance to the detected rear moving object V is long, it is determined that the rear moving object V is present when the area of the rear moving object V that has appeared in the blind spot area BR or the blind spot area BL is equal to or greater than 75% of the area of the whole moving object V that may appear in the same area. The distance between the vehicle 100 and the detected rear moving object V can be obtained by identifying a ground contact position that is based on the contour of the detected rear moving object V when the rear moving object V is detected from the first video data 110A by the recognizing unit 71, and then using a positional relationship of the ground contact position in the first video data 110A. Specifically, if the distance from the vehicle 100 to the rear moving object V is equal to or longer than 100 m, it is determined that the rear moving object V is present when the area of the rear moving object V that has appeared in the blind spot area BR or the blind spot area BL is equal to or greater than 75% of the area of the whole moving object V that may appear in the same area. Further, if the distance from the vehicle 100 to the rear moving object V is equal to or longer than 50 m and shorter than 100 m, it is determined that the rear moving object V is present when the area of the rear moving object V that has appeared in the blind spot area BR or the blind spot area BL is equal to or greater than 50% of the area of the whole moving object V that may appear in the same area. Furthermore, if the distance from the vehicle 100 to the rear moving object V is shorter than 50 m, it is determined that the rear moving object V is present when the area of the rear moving object V that has appeared in the blind spot area BR or the blind spot area BL is equal to or greater than 25% of the area of the whole moving object V that may appear in the same area.

With reference to FIG. 15, a concrete example of the blind spot display process performed by the display control unit 90A will be described. At Step SA11, the display control unit 90A determines that the rear moving object V1 and the rear moving object V2 are detected in the first video data 110A (Yes at Step SA11). Subsequently, the display control unit 90A determines that the rear moving object V1 is present in the blind spot area BL of the first video data 110A (Yes at Step SA12). At Step SA13, the display control unit 90A causes the display screen of the rearview monitor 140 to additionally display the blind spot area BL corresponding to the side on which the rear moving object V1 is detected.

Figure 17:
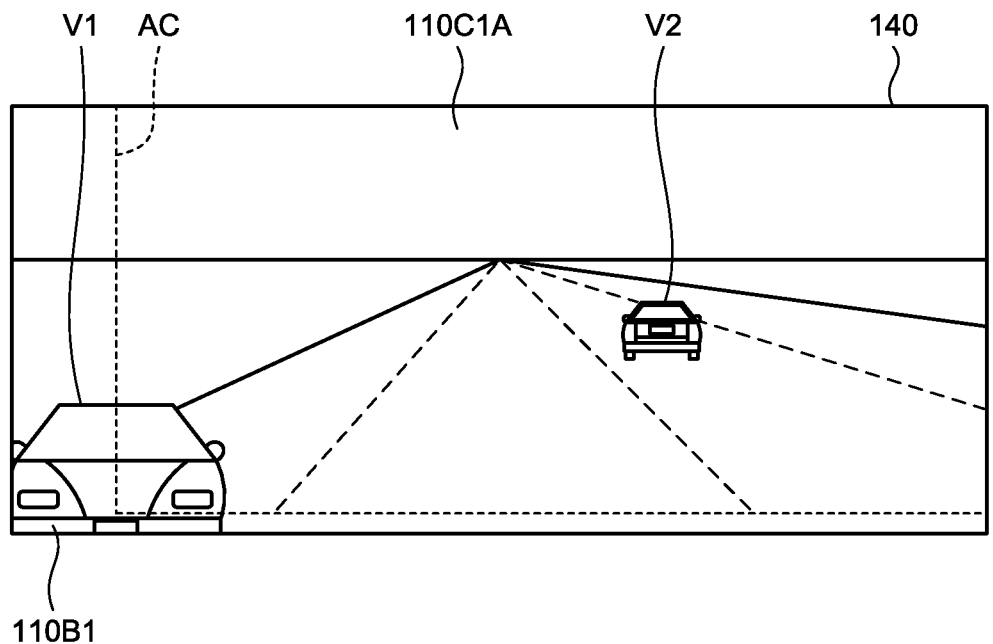
FIG. 17 is a diagram illustrating another example of video displayed on a rearview monitor of the on-vehicle display system according to the third embodiment.

Specifically, as illustrated in FIG. 17, the display control unit 90A performs extended display so as to include the blind spot area BL on the display screen of the rearview monitor 140. FIG. 17 is a diagram illustrating another example of video displayed on the rearview monitor of the on-vehicle display system according to the third embodiment. Specifically, rear video data 110C1A is extended so as to include extended video data 110B1 that includes the blind spot area BL. The extended video data 110B1 is video of an L-shaped area that is extended outward on the blind spot area BL side in the rear video data 110C1A. The first area AC as a display area of the normal display is indicated by a dashed line.

Figure 18:
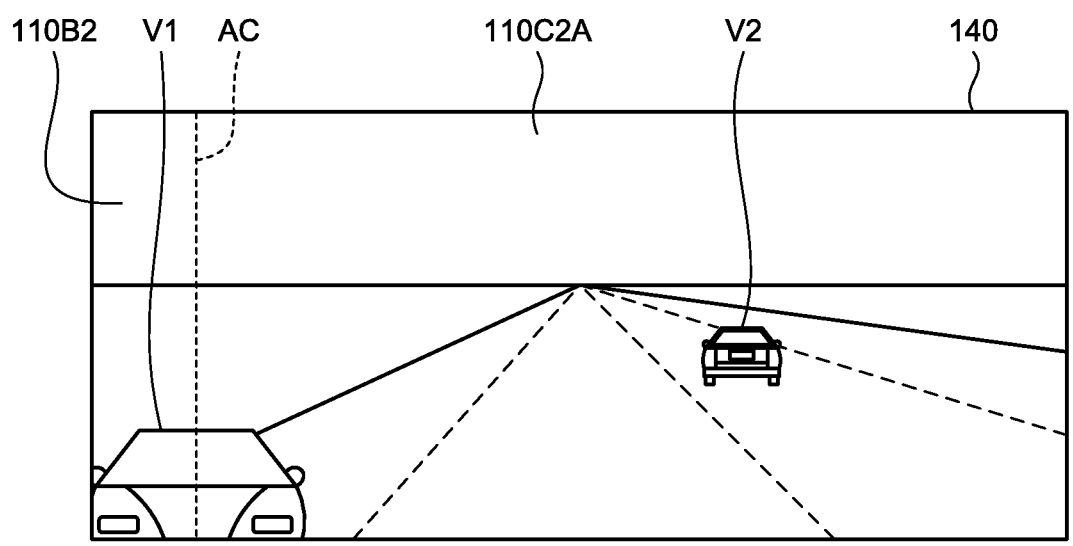
FIG. 18 is a diagram illustrating another example of video displayed on the rearview monitor of the on-vehicle display system according to the third embodiment.

Alternatively, as illustrated in FIG. 18, the display control unit 90A may cause the display screen of the rearview monitor 140 to perform extended display so as to include the blind spot area BL, and then shift the display to the opposite side. FIG. 18 is a diagram illustrating another example of video displayed on the rearview monitor of the on-vehicle display system according to the third embodiment. Specifically, rear video data 110C2A is extended so as to include extended video data 110B2 that includes the blind spot area BL, and shifted to the right side opposite to the blind spot area BL. The extended video data 110B2 is video of an I-shaped area that is extended leftward on the blind spot area BL side in the rear video data 110C2A.

Figure 19:
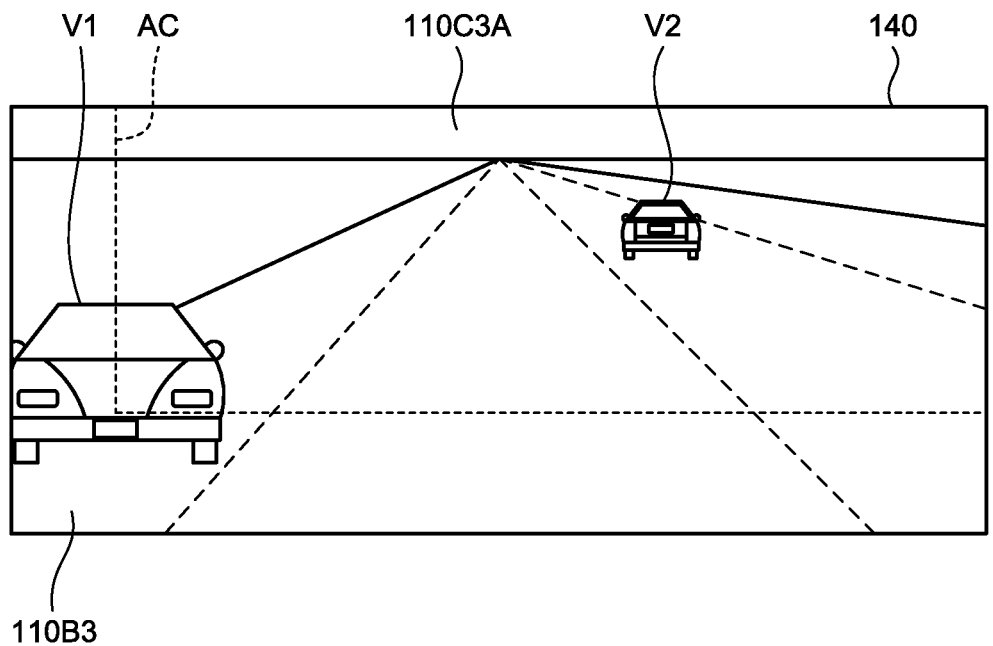
FIG. 19 is a diagram illustrating still another example of video displayed on the rearview monitor of the on-vehicle display system according to the third embodiment.

Alternatively, as illustrated in FIG. 19, the display control unit 90A may cause the display screen of the rearview monitor 140 to perform extended display in accordance with a vertical length of the blind spot area BL, and then shift the display to the opposite side. FIG. 19 is a diagram illustrating still another example of video displayed on the rearview monitor of the on-vehicle display system according to the third embodiment. Specifically, rear video data 110C3A is extended so as to include extended video data 110B3 that includes the blind spot area BL in accordance with the vertical length of the blind spot area BL, and shifted to the right side opposite to the blind spot area BL. The extended video data 110B3 is video of an L-shaped area that is extended outward on the blind spot area BL side in the rear video data 110C3A in accordance with the vertical length of the blind spot area BL.

Figure 20:
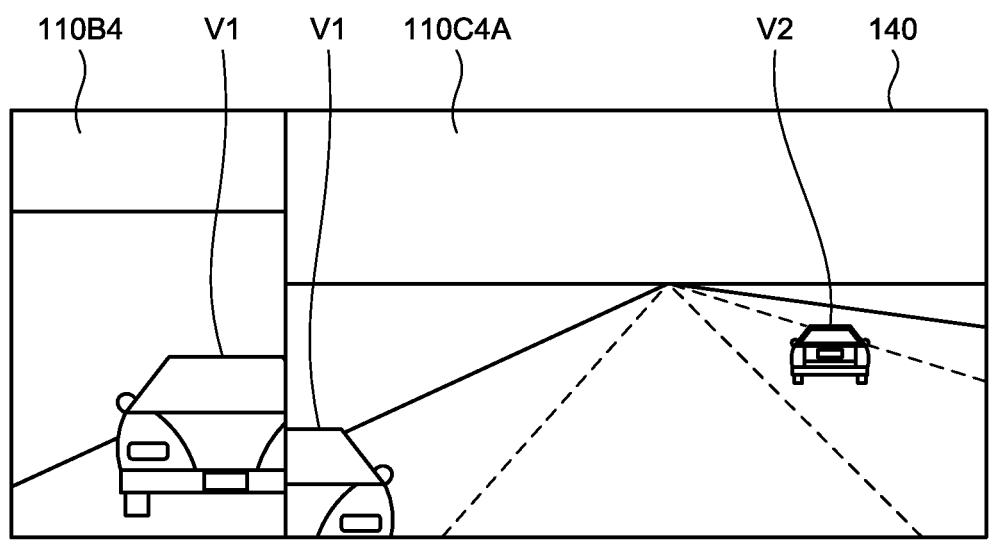
FIG. 20 is a diagram illustrating still another example of video displayed on the rearview monitor of the on-vehicle display system according to the third embodiment.

Alternatively, as illustrated in FIG. 20, the display control unit 90A may cause the display screen of the rearview monitor 140 to display the first area AC and the second area AL including the blind spot area BL. FIG. 20 is a diagram illustrating still another example of video displayed on the rearview monitor of the on-vehicle display system according to the third embodiment. Specifically, rear video data 110C4A and extended video data 110B4 including the blind spot area BL are displayed side by side. The extended video data 110B4 is video obtained by clipping an area including the blind spot area BL from the first video data 110A illustrated in FIG. 15. In this case, the rear video data 110C4A and the left rear video data 110L have different vertical lengths as illustrated in FIG. 4; therefore, vertical positions of the rear moving object V1 located at the boundary are deviated from each other in the display.

Figure 21:
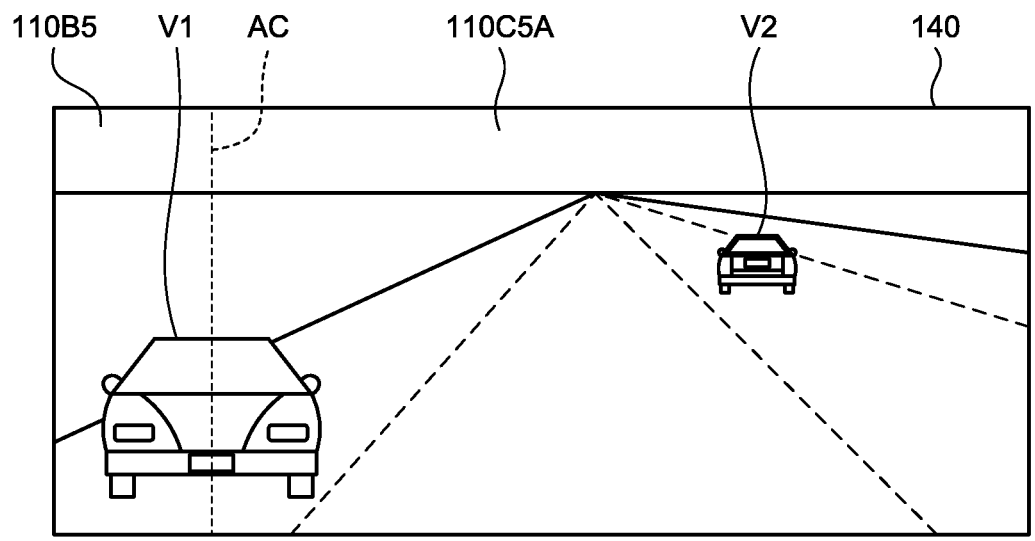
FIG. 21 is a diagram illustrating still another example of video displayed on the rearview monitor of the on-vehicle display system according to the third embodiment.

Alternatively, as illustrated in FIG. 21, the display control unit 90A may cause the display screen of the rearview monitor 140 to display the first area AC and the second area AL including the blind spot area BL such that the positions of the rear moving object V1 are aligned. FIG. 21 is a diagram illustrating still another example of video displayed on the rearview monitor of the on-vehicle display system according to the third embodiment. Specifically, rear video data 11005A and extended video data 110B5 including the blind spot area BL are displayed side by side such that an image of the rear moving object V1 is continued. The extended video data 110B5 is video obtained by clipping an area including the blind spot area BL from the first video data 110A illustrated in FIG. 15.

In this manner, the display control unit 90A of the on-vehicle display system 1A causes the rearview monitor 140 to display the rear moving object V present in the blind spot of the right side monitor 150 or the left side monitor 160.

As described above, when the rear moving object V is present in the blind spot of the right side monitor 150 or the left side monitor 160, the on-vehicle display system 1A according to the third embodiment causes the rearview monitor 140 to additionally display the blind spot area BR or the blind spot area BL in which the rear moving object V is located. In this manner, the on-vehicle display system 1A displays the rear moving object V present in the blind spot of the right side monitor 150 or the left side monitor 160. Therefore, the on-vehicle display system 1A can check the rear moving object V located in an area of a blind spot of a conventional side mirror. The on-vehicle display system 1A can more reliably check the safety around the vehicle 100. Thus, the on-vehicle display system 1A can appropriately check surroundings of the vehicle 100.

Fourth Embodiment

Figure 22:
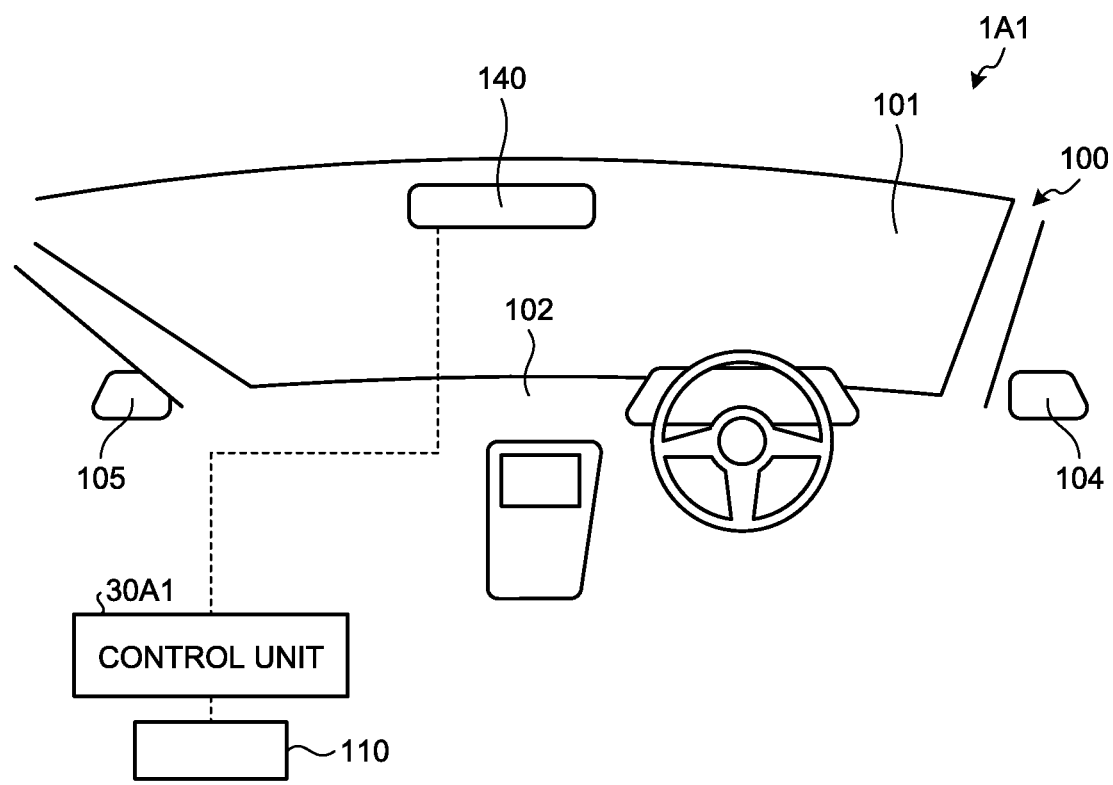
FIG. 22 is a schematic diagram illustrating a configuration example of an on-vehicle display system according to a fourth embodiment.
Figure 23:
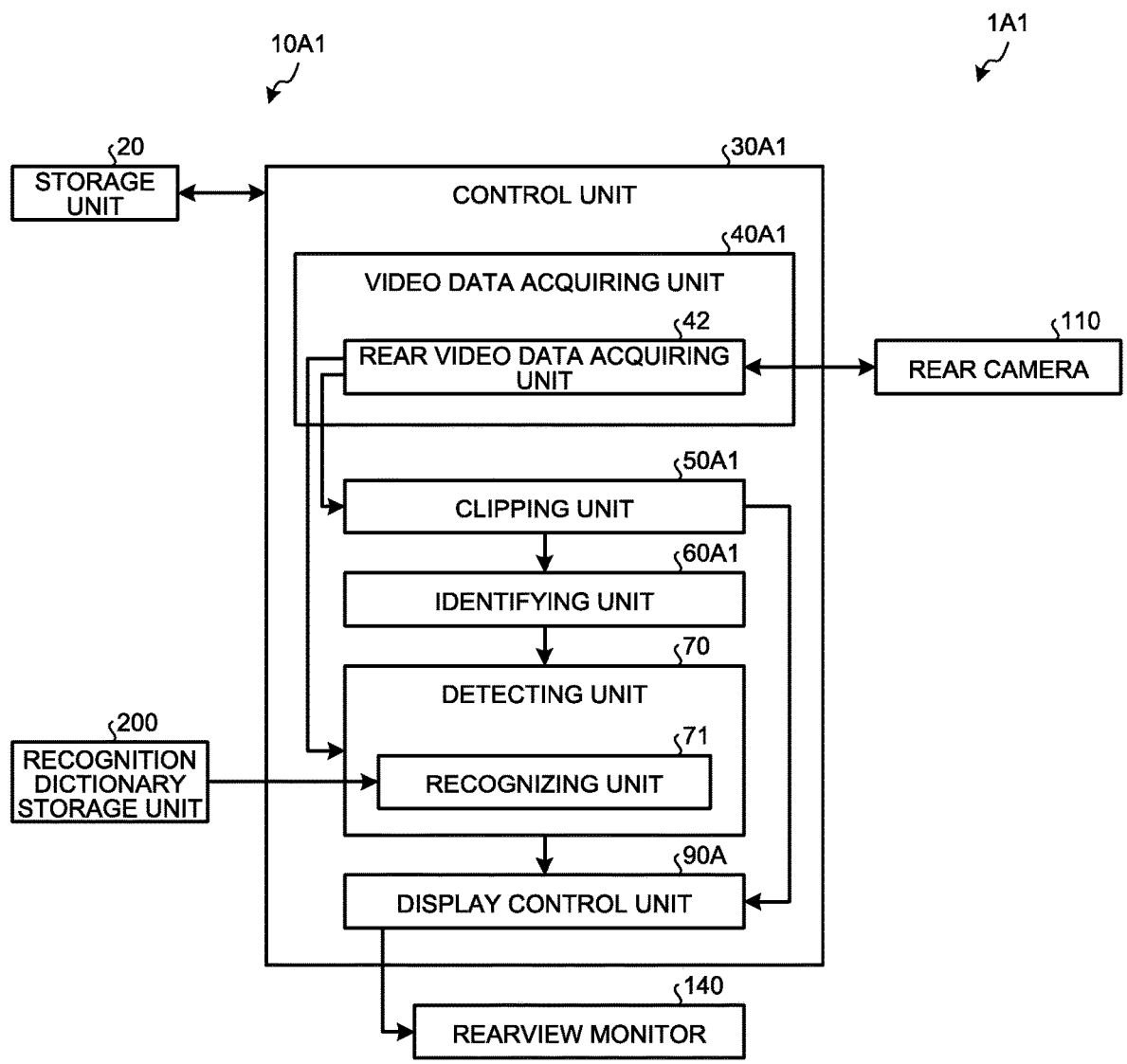
FIG. 23 is a block diagram illustrating a configuration example of the on-vehicle display system according to the fourth embodiment.

With reference to FIG. 22 and FIG. 23, an on-vehicle display system 1A1 according to a fourth embodiment will be described. FIG. 22 is a schematic diagram illustrating a configuration example of the on-vehicle display system according to the fourth embodiment. FIG. 23 is a block diagram illustrating a configuration example of the on-vehicle display system according to the fourth embodiment. A basic configuration of the on-vehicle display system 1A1 is the same as that of the on-vehicle display system 1A of the third embodiment. In the following descriptions, the same components as those of the on-vehicle display system 1A will be denoted by the same reference signs or corresponding reference signs, and detailed explanation thereof will be omitted. The on-vehicle display system 1A1 according to the fourth embodiment is different from the on-vehicle display system 1A of the third embodiment in that it includes a right side mirror (lateral rear checking device) 104 and a left side mirror (lateral rear checking device) 105 instead of the right side camera 120, the left side camera 130, the right side monitor 150, and the left side monitor 160 of the on-vehicle display system 1A of the third embodiment.

The right side mirror 104 is arranged on the right part of the vehicle 100 and displays the right side of the vehicle 100. The angle of the right side mirror 104 is freely adjustable. The right side mirror 104 has an area in which the right side body 100R of the vehicle 100 appears and rear visibility is limited.

The left side mirror 105 is arranged on the left part of the vehicle 100 and displays the left side of the vehicle 100. The angle of the left side mirror 105 is freely adjustable. The left side mirror 105 has an area in which the left side body 100L of the vehicle 100 appears and rear visibility is limited.

An on-vehicle display control device 10A1 includes the storage unit 20 and a control unit 30A1.

The control unit 30A1 includes a video data acquiring unit 40A1 including the rear video data acquiring unit 42, a clipping unit 50A1 that clips the first area AC that is a part of the first video data 110A, an identifying unit 60A1, the detecting unit 70, and the display control unit 90A.

The identifying unit 60A1 identifies, in the first video data 110A, the second area AR and the second area AL, which are located on the lateral sides of the first area AC, and the blind spot area BR or the blind spot area BL, which corresponds to a blind spot of the right side mirror 104 and the left side mirror 105. Specifically, the identifying unit 60A1 identifies the second area AR, the second area AL, the blind spot area BR, and the blind spot area BL in the first video data 110A based on the first video data 110A. More specifically, as illustrated in FIG. 15, the identifying unit 60A1 displays frame borders representing the second area AR, the second area AL, the blind spot area BR, and the blind spot area BL together with the rear video data 110C on the rearview monitor 140, and makes settings in accordance with operation performed by the driver or the like. The driver or the like moves the frame borders to correct positions such that the right side mirror 104 and the left side mirror 105 match the frame borders displayed on the rearview monitor 140. In this manner, the identifying unit 60A1 identifies the second area AR, the second area AL, the blind spot area BR, and the blind spot area BL in the first video data 110A. The identifying unit 60A1 performs this process when the angle of the rear camera 110, the right side mirror 104, or the left side mirror 105 is adjusted, or when the rear camera 110, the right side mirror 104, or the left side mirror 105 is replaced.

With this configuration, the display control unit 90A of the on-vehicle display system 1A1 causes the rearview monitor 140 to display the rear moving object V present in the blind spot of the right side mirror 104 or the left side mirror 105, similarly to the third embodiment.

As described above, when the rear moving object V is present in the blind spot of the right side mirror 104 or the left side mirror 105, the on-vehicle display system 1A1 according to the fourth embodiment causes the rearview monitor 140 to additionally display the blind spot area BR or the blind spot area BL in which the rear moving object V is located. In this manner, the on-vehicle display system 1A1 displays the rear moving object V present in the blind spot of the right side mirror 104 or the left side mirror 105. Therefore, the on-vehicle display system 1A1 can check the rear moving object V located in areas corresponding to the blind spots of the right side mirror 104 and the left side mirror 105. The on-vehicle display system 1A1 can more reliably check the safety around the vehicle 100. Thus, the on-vehicle display system 1A1 can appropriately check surroundings of the vehicle 100.

Fifth Embodiment

With reference to FIG. 24 to FIG. 30, an on-vehicle display system 1B according to a fifth embodiment will be described.

A configuration of the on-vehicle display system 1B is the same as that of the on-vehicle display system 1 of the first embodiment, and therefore is not illustrated in the drawings. The right side camera 120 and the left side camera 130 serve as the lateral rear cameras. The right side monitor 150 and the left side monitor 160 serve as the lateral rear checking devices.

Figure 24:
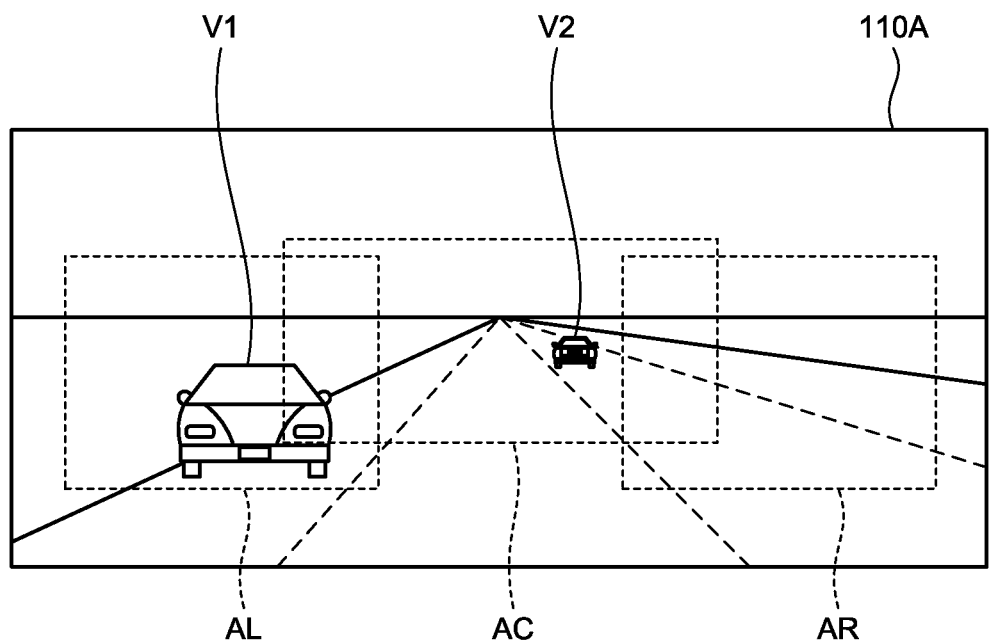
FIG. 24 is a diagram illustrating an example of video data captured by a rear camera of an on-vehicle display system according to a fifth embodiment.

Specifically, the rear camera 110 captures the first video data 110A as illustrated in FIG. 24. FIG. 24 is a diagram illustrating an example of video data captured by a rear camera of the on-vehicle display system according to the fifth embodiment. The first video data 110A includes at least a part of the first area AC that is an area checked by the rearview monitor 140, and the second areas AR and AL that are areas checked by the right side monitor 150 and the left side monitor 160. The first video data 110A includes a blind spot of the right side camera 120 on the lateral side of the first area AC.

The control unit 30 includes the video data acquiring unit 40, the clipping unit 50, an identifying unit 60B, a detecting unit 70B, and a display control unit 90B.

The identifying unit 60B identifies the second area AR and the second area AL located on the lateral sides of the first area AC in the first video data 110A. As an alternative identification method, the identifying unit 60B may perform image matching based on the second video data and the first video data 110A, and identify the second area AR and the second area AL in the first video data 110A as illustrated in FIG. 24. The identifying unit 60B outputs, to the detecting unit 70B, information on the second area AR and the second area AL that are identified in the first video data 110A.

The identifying unit 60B may display frame borders representing the second area AR and the second area AL together with the rear video data 110C on the rearview monitor 140 as illustrated in FIG. 24, and make settings in accordance with operation performed by the driver or the like. Specifically, the driver or the like moves the frame borders to correct positions such that the right rear video data 110R displayed on the right side monitor 150 and the left rear video data 110L displayed on the left side monitor 160 match the frame borders displayed on the rearview monitor 140. The identifying unit 60B may identify the second area AR and the second area AL in the first video data 110A in the manner as described above.

The detecting unit 70B detects the rear moving object V from the first video data 110A. The detecting unit 70B includes the recognizing unit 71 that performs moving object recognition on the first video data 110A and recognizes the rear moving object V. The recognizing unit 71 performs pattern matching on the first video data 110A using the recognition dictionary stored in the recognition dictionary storage unit 200, and detects presence of the rear moving object V. Further, the detecting unit 70B detects a position of the detected rear moving object V in the first video data 110A. If the position of the recognized rear moving object V is moved in the first video data 110A, the detecting unit 70B detects a direction in which the rear moving object V has moved as a moving direction. In a case where the detecting unit 70B detects the moving direction of the rear moving object V, when the rear moving object V in the first video data 110A has a license plate, the detecting unit 70B may read alphanumeric characters and signs on the license plate and detect the moving direction of the rear moving object V using the read alphanumeric characters and signs.

The display control unit 90B causes the rearview monitor 140 to display the rear video data 110C clipped by the clipping unit 50 as a normal display process that is performed in normal times. The display control unit 90B causes the right side monitor 150 to display the right rear video data 110R clipped by the clipping unit 50 as the normal display process that is performed in normal times. The display control unit 90B causes the left side monitor 160 to display the left rear video data 110L clipped by the clipping unit 50 as the normal display process that is performed in normal times.

The display control unit 90B determines whether a predetermined condition is satisfied for each frame or for each predetermined frame in addition to the normal display process as described above, and if the predetermined condition is satisfied, the display control unit 90B performs an identity display process of displaying identity of the rear moving object V. Specifically, if the rear moving object V detected by the detecting unit 70B moves across the first area AC and the second area AR or the second area AL, the display control unit 90B causes the rearview monitor 140, the right side monitor 150, and the left side monitor 160 to display an icon M indicating the identity of the rear moving object V. More specifically, if the rear moving object V moves across the first area AC and the second area AR or the second area AL, the display control unit 90B causes the rearview monitor 140 to display the icon M in a manner superimposed on the position of the rear moving object V in the first video data 110A. If the rear moving object V moves across the first area AC and the second area AR, the display control unit 90B causes the right side monitor 150 to display the icon M in a manner superimposed on a certain position in the right rear video data 110R corresponding to the position of the rear moving object V in the first video data 110A. If the rear moving object V moves across the first area AC and the second area AL, the display control unit 90B causes the left side monitor 160 to display the icon M in a manner superposed on a certain position in the left rear video data 110L corresponding to the position of the rear moving object V in the first video data 110A. In the fifth embodiment, the icon M indicating the identity has a circular shape enclosing the rear moving object V. The size, the shape, the color, or the like of the icon M may be changed for each of the rear moving objects V.

Figure 26:
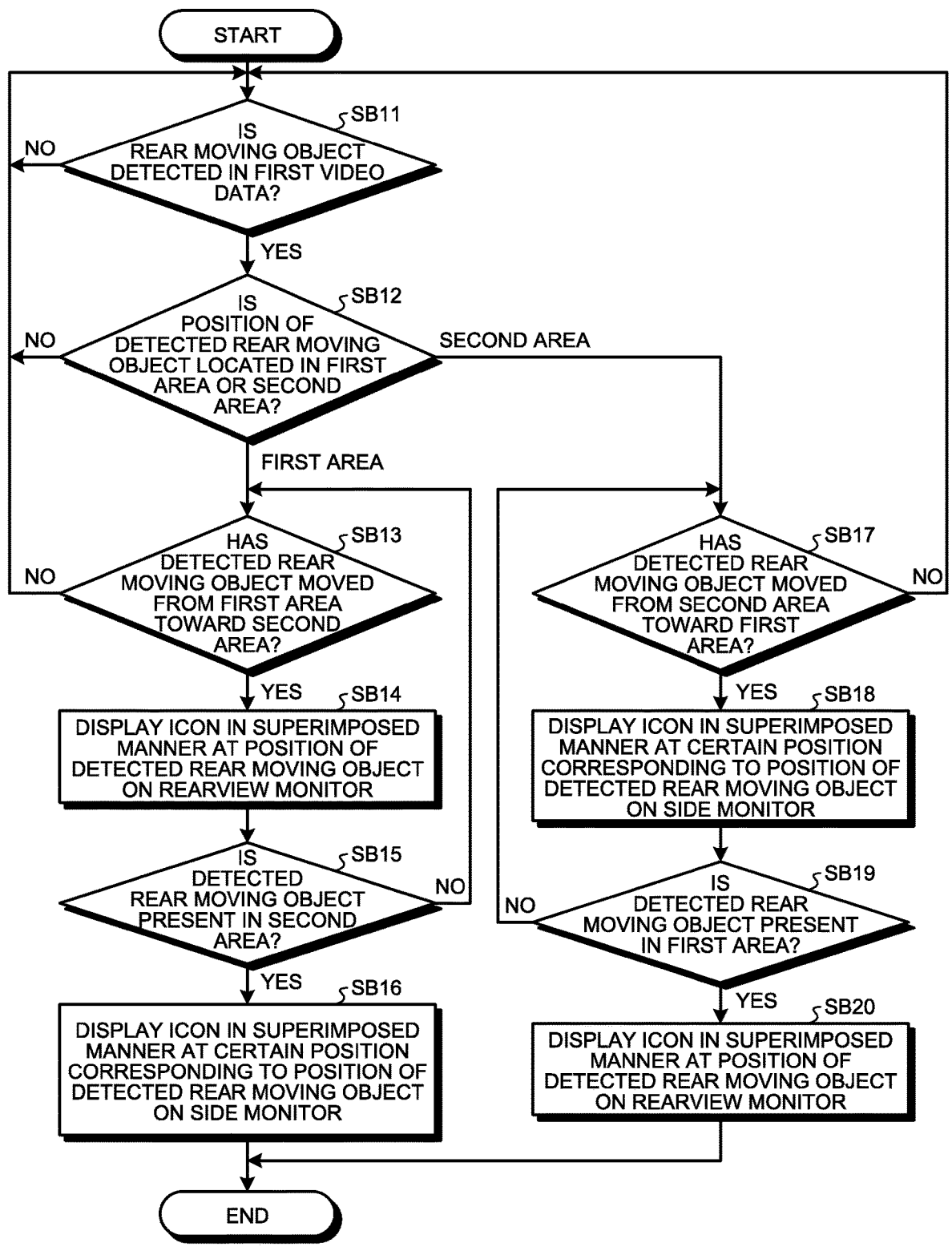
FIG. 26 is a flowchart illustrating the flow of a process performed by a display control unit of an on-vehicle display control device of the on-vehicle display system according to the fifth embodiment.

Next, with reference to FIG. 26, the flow of the identity display process performed by the display control unit 90B will be described. FIG. 26 is a flowchart illustrating the flow of a process performed by the display control unit of the on-vehicle display control device of the on-vehicle display system according to the fifth embodiment.

The display control unit 90B determines whether the rear moving object V is detected in the first video data 110A (Step SB11). More specifically, the display control unit 90B determines whether the detecting unit 70B has detected the rear moving object V in the first video data 110A.

If the display control unit 90B determines that the rear moving object V is not detected in the first video data 110A (No at Step SB11), the process at Step SB11 is repeated.

If the display control unit 90B determines that the rear moving object V is detected in the first video data 110A (Yes at Step SB11), the process proceeds to Step SB12.

The display control unit 90B determines whether the detected rear moving object V is present in the first area AC or either the second area AR or the second area AL of the first video data 110A (Step SB12). More specifically, the display control unit 90B determines whether the rear moving object V or a part of the rear moving object V (hereinafter, described as the rear moving object V) is present in the first area AC or either the second area AR or the second area AL of the first video data 110A.

If the display control unit 90B determines that the detected rear moving object V is not present in the first area AC or either the second area AR or the second area AL of the first video data 110A (No at Step SB12), the process returns to Step SB11 and the process is repeated.

If the display control unit 90B determines that the detected rear moving object V is present in the first area AC of the first video data 110A (Yes at Step SB12 and "first area"), the process proceeds to Step SB13.

If the display control unit 90B determines that the detected rear moving object V is present in the second area AR or the second area AL of the first video data 110A (Yes at Step SB12 and "second area"), the process proceeds to Step SB17.

The display control unit 90B determines whether the detected rear moving object V has moved from the first area AC toward the second area AR or the second area AL in the first video data 110A (Step SB13). More specifically, the display control unit 90B determines whether the detecting unit 70B has detected that the moving direction of the rear moving object V corresponds to a direction from the first area AC to the second area AR or the second area AL in the first video data 110A.

If the display control unit 90B determines that the detected rear moving object V is not moving from the first area AC toward the second area AR or the second area AL in the first video data 110A (No at Step SB13), the process returns to Step SB11 and the process is repeated.

If the display control unit 90B determines that the detected rear moving object V is moving from the first area AC toward the second area AR or the second area AL in the first video data 110A (Yes at Step SB13), the process proceeds to Step SB14.

The display control unit 90B causes the rearview monitor 140 to display the icon M in a manner superimposed on the position of the detected rear moving object V (Step SB14). More specifically, the display control unit 90B causes the rearview monitor 140 to display the icon M in a manner superimposed on the position of the rear moving object V in the first video data 110A. Then, the display control unit 90B continuously displays the icon M in a manner superimposed on the position of the rear moving object V in the first video data 110A in which the moving direction is being detected by the detecting unit 70B. Therefore, the display control unit 90B causes the rearview monitor 140 to display the icon M in a superimposed manner while the detected rear moving object V is being displayed thereon.

The display control unit 90B determines whether the detected rear moving object V is present in the second area AR or the second area AL of the first video data 110A (Step SB15). More specifically, the display control unit 90B determines that the rear moving object V is present in the second area AR or the second area AL when the area of the rear moving object V that has appeared in the second area AR or the second area AL is equal to or greater than half of the area of the whole rear moving object V that may appear in the same area.

If the display control unit 90B determines that the detected rear moving object V is not present in the second area AR or the second area AL of the first video data 110A (No at Step SB15), the process returns to Step SB13 and the process is repeated. More specifically, the display control unit 90B repeats the process until the rear moving object V moves to the second area AR or the second area AL of the first video data 110A. In this case, the icon M is displayed on the rearview monitor 140, but not displayed on the right side monitor 150 nor the left side monitor 160.

If the display control unit 90B determines that the detected rear moving object V is present in the second area AR or the second area AL of the first video data 110A (Yes at Step SB15), the process proceeds to Step SB16. More specifically, if the rear moving object V moves to the second area AR or the second area AL of the first video data 110A, the display control unit 90B proceeds to Step SB16.

The display control unit 90B causes the right side monitor 150 or the left side monitor 160 to display the icon M in a manner superimposed on the position of the detected rear moving object V (Step SB16). More specifically, if it is determined that the rear moving object V is present in the second area AR of the first video data 110A, the display control unit 90B causes the right side monitor 150 to display the icon M in a manner superimposed on a certain position in the right rear video data 110R corresponding to the position of the rear moving object V in the first video data 110A. If it is determined that the rear moving object V is present in the second area AL of the first video data 110A, the display control unit 90B causes the left side monitor 160 to display the icon M in a manner superimposed on a certain position in the left rear video data 110L corresponding to the position of the rear moving object V in the first video data 110A. In this case, the icon M is displayed on the rearview monitor 140 and the right side monitor 150 or the left side monitor 160. Then, the display control unit 90B continuously displays the icon M in a manner superimposed on a certain position in the right rear video data 110R or the left rear video data 110L corresponding to the position of the rear moving object V in the first video data 110A in which the moving direction is being detected by the detecting unit 70B. Therefore, the display control unit 90B displays the icon M in a superimposed manner while the detected rear moving object V is being displayed on the right rear video data 110R or the left rear video data 110L.

The display control unit 90B determines whether the detected rear moving object V has moved from the second area AR or the second area AL toward the first area AC in the first video data 110A (Step SB17). More specifically, the display control unit 90B determines whether the detecting unit 70B has detected that the moving direction of the rear moving object V is a direction from the second area AR or the second area AL toward the first area AC in the first video data 110A.

If the display control unit 90B determines that the detected rear moving object V is not moving from the second area AR or the second area AL toward the first area AC in the first video data 110A (No at Step SB17), the process returns to Step SB11 and the process is repeated.

If the display control unit 90B determines that the detected rear moving object V is moving from the second area AR or the second area AL toward the first area AC in the first video data 110A (Yes at Step SB17), the process proceeds to Step SB18.

The display control unit 90B causes the right side monitor 150 or the left side monitor 160 to display the icon M in a manner superimposed on the position of the detected rear moving object V (Step SB18). More specifically, if it is determined that the rear moving object V has moved from the second area AR toward the first area AC in the first video data 110A, the display control unit 90B causes the right side monitor 150 to display the icon M in a manner superimposed on a certain position in the right rear video data 110R corresponding to the position of the rear moving object V in the first video data 110A. If it is determined that the rear moving object V has moved from the second area AL toward the first area AC in the first video data 110A, the display control unit 90B causes the left side monitor 160 to display the icon M in a manner superimposed on a certain position in the left rear video data 110L corresponding to the position of the rear moving object V in the first video data 110A. Then, the display control unit 90B continuously displays the icon M in a manner superimposed on a certain position in the right rear video data 110R or the left rear video data 110L corresponding to the position of the rear moving object V in the first video data 110A in which moving direction is being detected by the detecting unit 70B. Therefore, the display control unit 90B displays the icon M in a superimposed manner while the detected rear moving object V is being displayed on the right rear video data 110R or the left rear video data 110L.

The display control unit 90B determines whether the detected rear moving object V is present in the first area AC of the first video data 110A (Step SB19). More specifically, if the area of the rear moving object V that has appeared in the first area AC is equal to or greater than half of the area of the whole rear moving object V that may appear in the same area, the display control unit 90B determines that the rear moving object V1 is present in the first area AC.

If the display control unit 90B determines that the detected rear moving object V is not present in the first video data 110A (No at Step SB19), the process returns to Step SB17 and the process is repeated. More specifically, the display control unit 90B repeats the process until the rear moving object V moves to the first area AC of the first video data 110A. In this case, the icon M is displayed on the right side monitor 150 or the left side monitor 160, but not displayed on the rearview monitor 140.

If the display control unit 90B determines that the detected rear moving object V is present in the first area AC of the first video data 110A (Yes at Step SB19), the process proceeds to Step SB20. More specifically, if the rear moving object V moves to the first area AC of the first video data 110A, the display control unit 90B proceeds to Step SB20.

The display control unit 90B causes the rearview monitor 140 to display the icon M in a manner superimposed on a position of the rear moving object V (Step SB20). More specifically, the display control unit 90B causes the rearview monitor 140 to display the circular icon M indicating the identity of the rear moving object V in a manner superimposed on the position of the rear moving object V in the first video data 110A. In this case, the icon M is displayed on the rearview monitor 140 and the right side monitor 150 or the left side monitor 160. Then, the display control unit 90B continuously displays the icon M in a manner superimposed on the position of the rear moving object V in the first video data 110A in which the moving direction is being detected by the detecting unit 70B. Therefore, the display control unit 90B causes the rearview monitor 140 to display the icon M in a superimposed manner while the detected rear moving object V is being displayed thereon.

The display control unit 90B may change a determination condition for determining whether the detected rear moving object V is present in the second area AR or the second area AL, depending on a distance between the vehicle 100 and the rear moving object V. For example, if the distance to the detected rear moving object V is short, it is determined that the rear moving object V is present when the area of the rear moving object V that has appeared in the second area AR or the second area AL is equal to or greater than 25% of the area of the whole moving object V that may appear in the same area. Further, if the distance to the detected rear moving object V is long, it is determined that the rear moving object V is present when the area of the rear moving object V that has appeared in the second area AR or the second area AL is equal to or greater than 75% of the area of the whole moving object V that may appear in the same area. The distance between the vehicle 100 and the detected rear moving object V can be obtained by identifying a ground contact position that is based on the contour of the detected rear moving object V when the recognizing unit 71 detects the rear moving object V from the first video data 110A, and then using a positional relationship of the ground contact position in the first video data 110A. Specifically, if the distance from the vehicle 100 to the rear moving object V is equal to or longer than 100 m, it is determined that the rear moving object V is present when the area of the rear moving object V that has appeared in the second area AR or the second area AL is equal to or greater than 75% of the area of the whole moving object V that may appear in the same area. Further, if the distance from the vehicle 100 to the rear moving object V is equal to or longer than 50 m and shorter than 100 m, it is determined that the rear moving object V is present when the area of the rear moving object V that has appeared in the second area AR or the second area AL is equal to or greater than 50% of the area of the whole moving object V that may appear in the same area. Furthermore, if the distance from the vehicle 100 to the rear moving object V is shorter than 50 m, it is determined that the rear moving object V is present when the area of the rear moving object V that has appeared in the second area AR or the second area AL is equal to or greater than 25% of the area of the whole moving object V that may appear in the same area.

The processes from Step SB12 to Step SB20 by the display control unit 90B are performed for each of the rear moving objects V detected at Step SB11.

With reference to FIG. 24 and FIG. 25, FIG. 27 and FIG. 28, and FIG. 29 and FIG. 30, concrete examples of the identity display process performed by the display control unit 90B will be described.

Figure 25:
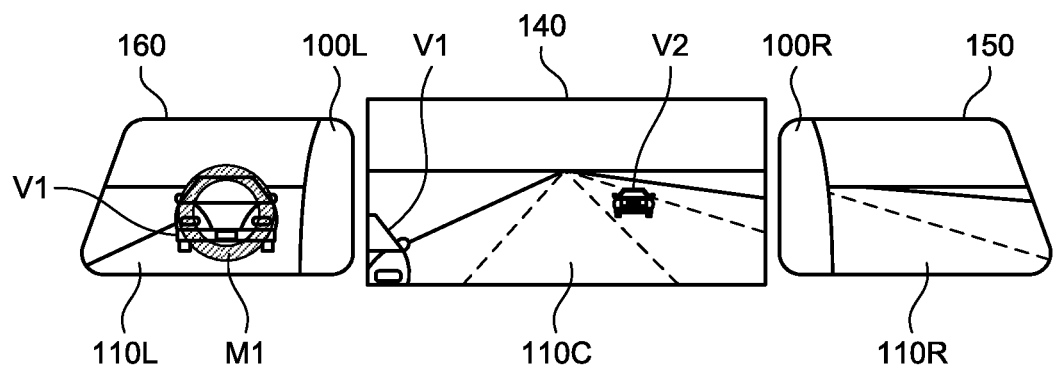
FIG. 25 is a diagram illustrating an example of video displayed on a rearview monitor, a right side monitor, and a left side monitor of the on-vehicle display system according to the fifth embodiment.

First, states illustrated in FIG. 24 and FIG. 25 will be described. The rear moving object V1 is moving from the second area AL to the first area AC, and the rear moving object V2 is receding. At Step SB11, the display control unit 90B determines that the rear moving object V1 and the rear moving object V2 are present in the first video data 110A (Yes at Step SB11). Then, at Step SB12 and Step SB13, the display control unit 90B determines that the rear moving object V1 is present in the second area AL of the first video data 110A (Yes at Step SB12 and "second area"), and moves from the second area AL to the first area AC in the first video data 110A (Yes at Step SB17). At Step SB18, the display control unit 90 causes the left side monitor 160 to display the icon M in a manner superimposed on the position of the rear moving object V1. Then, at Step SB19, the display control unit 90B determines that the rear moving object V is not present in the first area AC in the first video data 110A (No at Step SB19), and continues the process at Step SB19. In this manner, as illustrated in FIG. 25, the display control unit 90B causes the left side monitor 160 to display an icon M1 in a superimposed manner on the rear moving object V1, which is moving from the second area AL to the first area AC.

Figure 27:
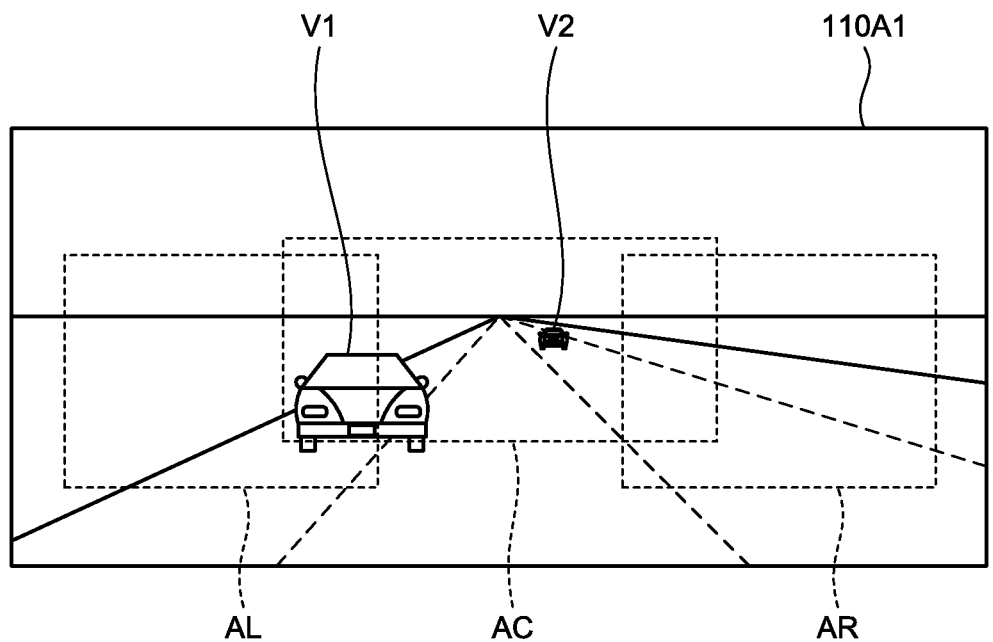
FIG. 27 is a diagram illustrating another example of video data captured by the rear camera of the on-vehicle display system according to the fifth embodiment.
Figure 28:
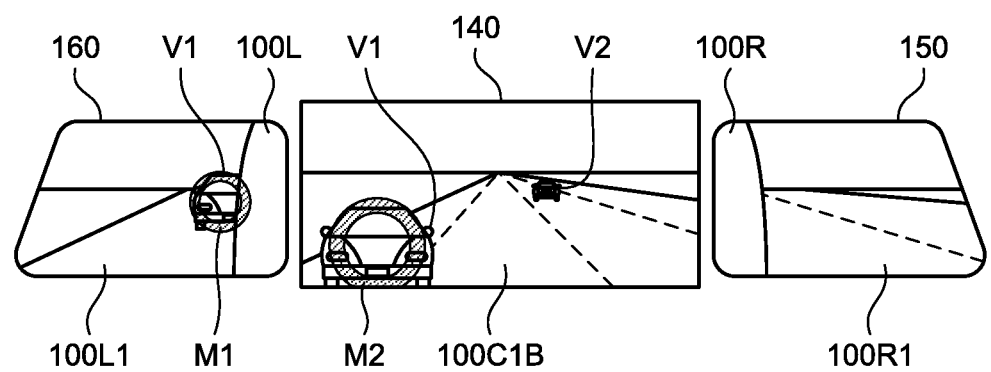
FIG. 28 is a diagram illustrating another example of video displayed on the rearview monitor, the right side monitor, and the left side monitor of the on-vehicle display system according to the fifth embodiment.

Next, states illustrated in FIG. 27 and FIG. 28, which are obtained slightly after the states illustrated in FIG. 24 and FIG. 25, will be described. FIG. 27 is a diagram illustrating another example of video data captured by the rear camera of the on-vehicle display system according to the fifth embodiment. FIG. 28 is a diagram illustrating another example of video displayed on the rearview monitor, the right side monitor, and the left side monitor of the on-vehicle display system according to the fifth embodiment. The display control unit 90B causes the rearview monitor 140 to display rear video data 110C1B, the right side monitor 150 to display right rear video data 110R1, and the left side monitor 160 to display left rear video data 110L1. The display control unit 90B causes the left side monitor 160 to continuously display the icon M1 in a manner superimposed on the position of the rear moving object V1. At Step SB19, the display control unit 90B determines that the rear moving object V1 is present in the first area AC of the first video data 110A1 (Yes at Step SB19). Then, at Step SB20, the display control unit 90B causes the rearview monitor 140 to display an icon M2 indicating the identity in a manner superimposed on the position of the rear moving object V1. In this manner, as illustrated in FIG. 28, the display control unit 90B causes the rearview monitor 140 to display the icon M indicating the identity of the rear moving object V1 moving from the second area AL to the first area AC in a superimposed manner.

Figure 29:
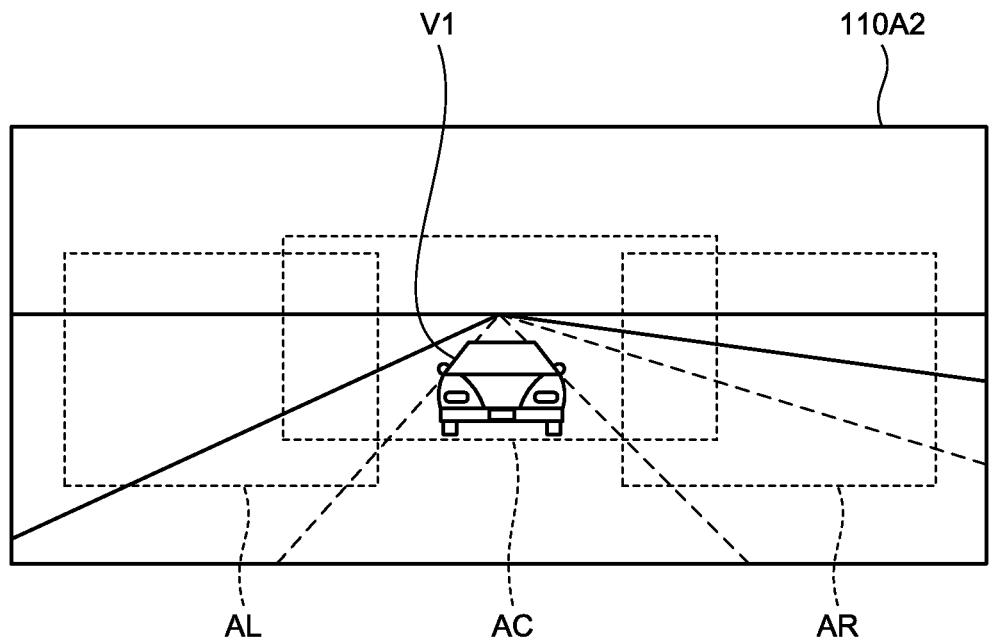
FIG. 29 is a diagram illustrating still another example of video data captured by the rear camera of the on-vehicle display system according to the fifth embodiment.
Figure 30:
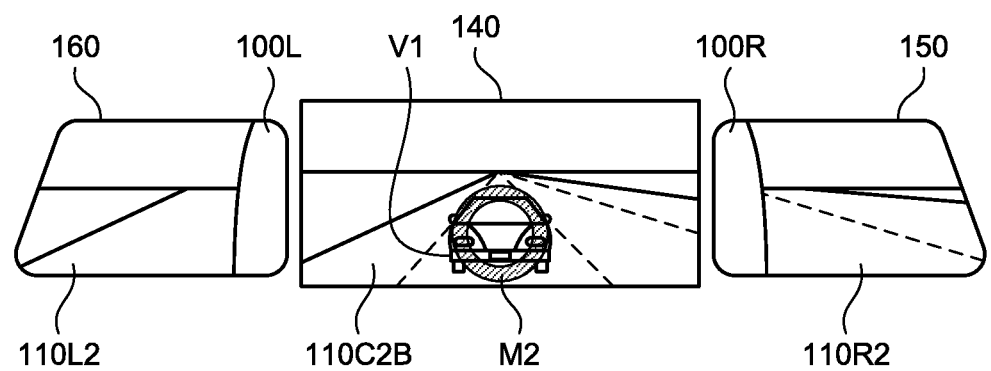
FIG. 30 is a diagram illustrating still another example of video displayed on the rearview monitor, the right side monitor, and the left side monitor of the on-vehicle display system according to the fifth embodiment.

Next, states illustrated in FIG. 29 and FIG. 30, which are obtained slightly after the states illustrated in FIG. 27 and FIG. 28, will be described. FIG. 29 is a diagram illustrating another example of video data captured by the rear camera of the on-vehicle display system according to the fifth embodiment. FIG. 30 is a diagram illustrating another example of video displayed on the rearview monitor, the right side monitor, and the left side monitor on the on-vehicle display system according to the fifth embodiment. The display control unit 90B causes the rearview monitor 140 to display rear video data 110C2B, the right side monitor 150 to display the right rear video data 110R2, and the left side monitor 160 to display the left rear video data 110L2. In this case, the rear moving object V1 has moved from the second area AL in the first video data 110A2, so that the rear moving object V1 is not displayed on the left side monitor 160. The display control unit 90B causes the rearview monitor 140 to continuously display the icon M indicating the identity in a manner superimposed on the position of the rear moving object V1. The purpose of displaying the icon M1 and the icon M2 respectively in a superimposed manner is to indicate the identity of the rear moving object V1; therefore, as illustrated in FIG. 30, the rear moving object V1 is not displayed on the left side monitor 160, whereas the icon M2 indicating the identity is displayed in a manner superimposed on the position of the rear moving object V1 by the rearview monitor 140, and then the superimposed display of the icon M2 is terminated after a lapse of 5 seconds, for example.

In this manner, the display control unit 90B of the on-vehicle display system 1B causes the rearview monitor 140, the right side monitor 150, and the left side monitor 160 to display to display the icon M indicating the identity in a manner superimposed on the rear moving object V on the rearview monitor 140, the right side monitor 150, and the left side monitor 160 in accordance with the position of the detected rear moving object V.

As described above, when the rear moving object V moves across the first area AC and the second area AR or the second area AL, the on-vehicle display system 1B according to the fifth embodiment causes the right side monitor 150, the left side monitor 160, and the rearview monitor 140 to display the icon M indicating the identity of the rear moving object V. In this manner, even when the rear moving object V is displayed on a plurality of the rearview monitor 140, the right side monitor 150, and the left side monitor 160, the on-vehicle display system 1B can easily confirm the identity by displaying the icon M indicating the identity.

Specifically, as illustrated in FIG. 24 and FIG. 25 for example, when the rear moving object V1 is moving across the first area AC and the second area AL, the icon M1 indicating the identity of the rear moving object V1 is displayed on the left side monitor 160. Further, as illustrated in FIG. 27 and FIG. 28 for example, when the rear moving object V1 is present in the first area AC and the second area AL, the icon M1 and the icon M2 indicating the identity of the rear moving object V1 is displayed on the left side monitor 160 and the rearview monitor 140 respectively in a superimposed manner. In this manner, it is possible to cause the rearview monitor 140, the right side monitor 150, and the left side monitor 160 to display the icon M indicating the identity in a manner superimposed on the rear moving object V in accordance with the position of the detected rear moving object V. As described above, the on-vehicle display system 1B can easily confirm the identity of the rear moving object V on the rearview monitor 140, the right side monitor 150, and the left side monitor 160.

Sixth Embodiment

Figure 31:
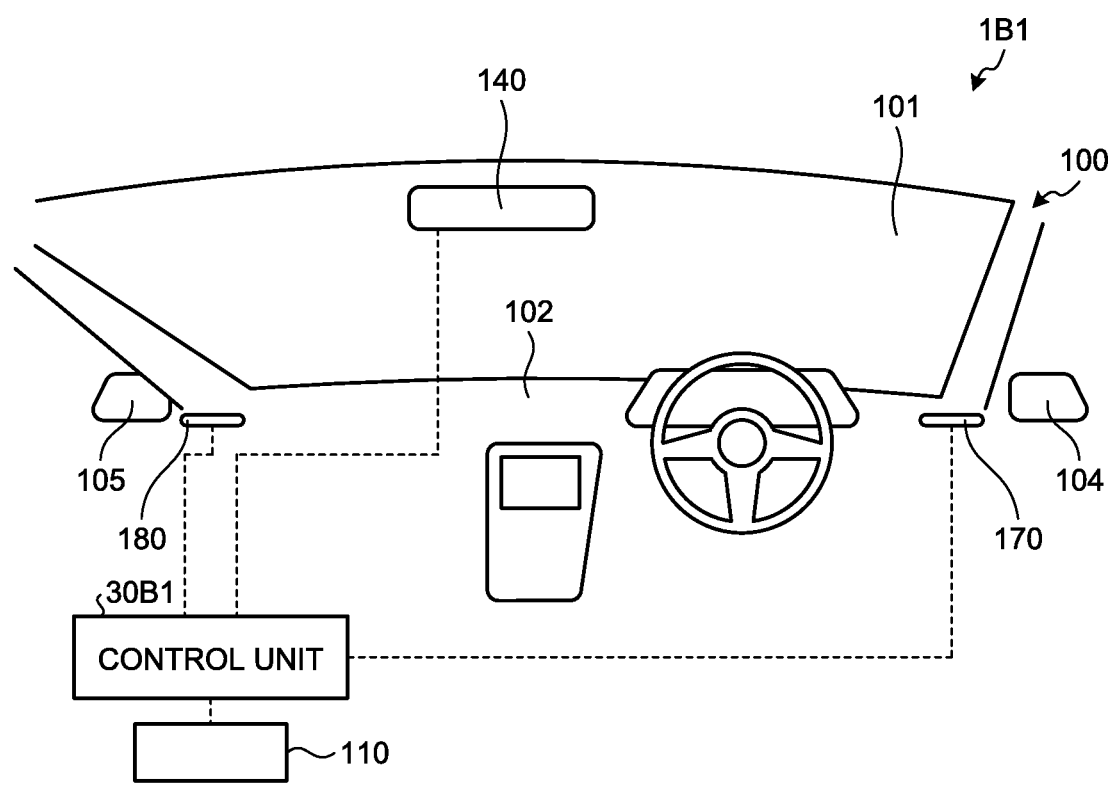
FIG. 31 is a schematic diagram illustrating a configuration example of an on-vehicle display system according to a sixth embodiment.
Figure 32:
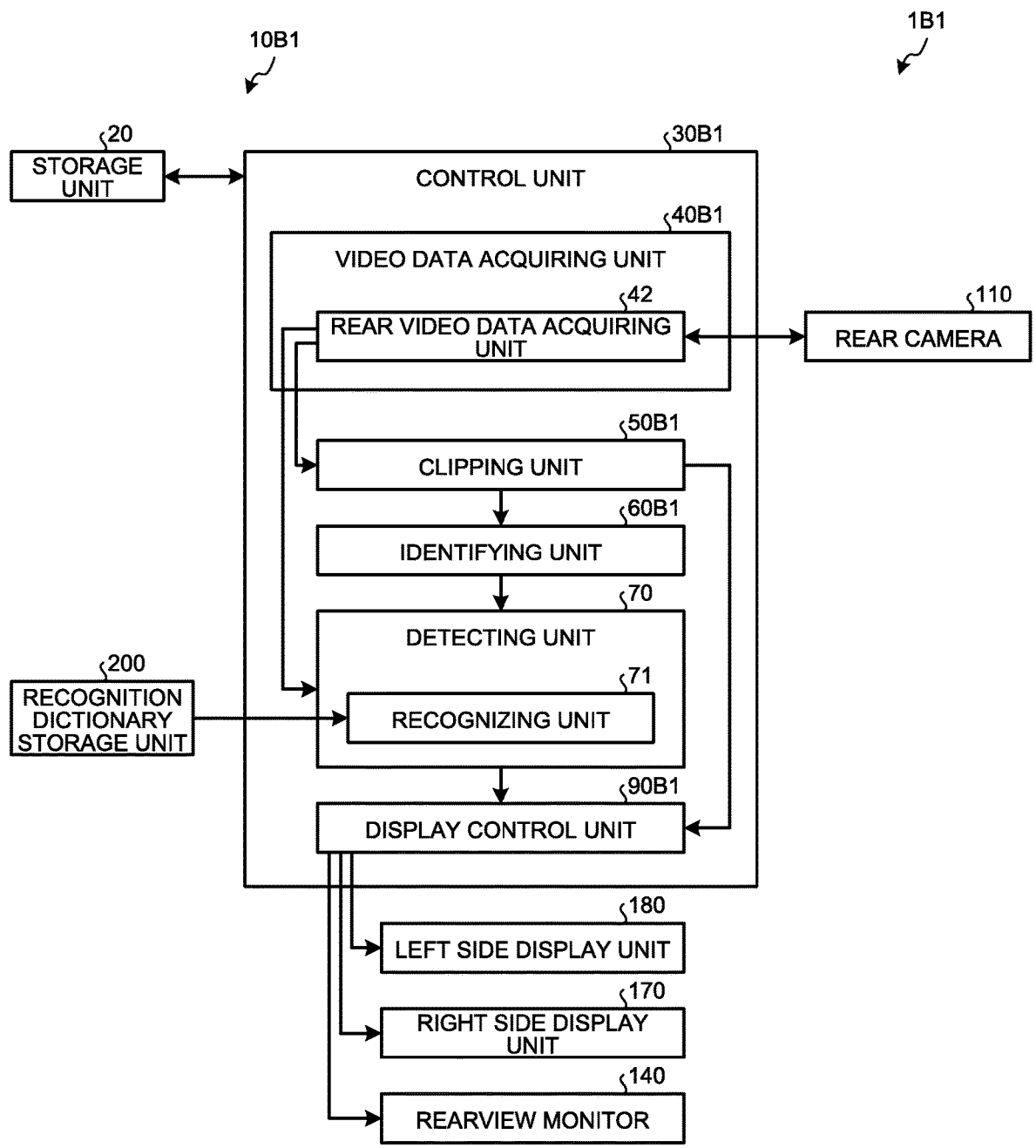
FIG. 32 is a block diagram illustrating a configuration example of the on-vehicle display system according to the sixth embodiment.

With reference to FIG. 31 to FIG. 35, an on-vehicle display system 1B1 according to a sixth embodiment will be described. FIG. 31 is a schematic diagram illustrating a configuration example of the on-vehicle display system according to the sixth embodiment. FIG. 32 is a block diagram illustrating a configuration example of the on-vehicle display system according to the sixth embodiment. A basic configuration of the on-vehicle display system 1B1 is the same as that of the on-vehicle display system 1B of the fifth embodiment. In the following descriptions, the same components as those of the on-vehicle display system 1 will be denoted by the same reference signs or corresponding reference signs, and detailed explanation thereof will be omitted. As illustrated in FIG. 31 and FIG. 32, the on-vehicle display system 1B1 according to the sixth embodiment is different from the on-vehicle display system 1B according to the fifth embodiment in that it includes the right side mirror (lateral rear checking device) 104, the left side mirror (lateral rear checking device) 105, a right side display unit 170, and a left side display unit 180, instead of the right side camera 120, the left side camera 130, the right side monitor 150, and the left side monitor 160 of the on-vehicle display system 1B according to the fifth embodiment.

Figure 33:
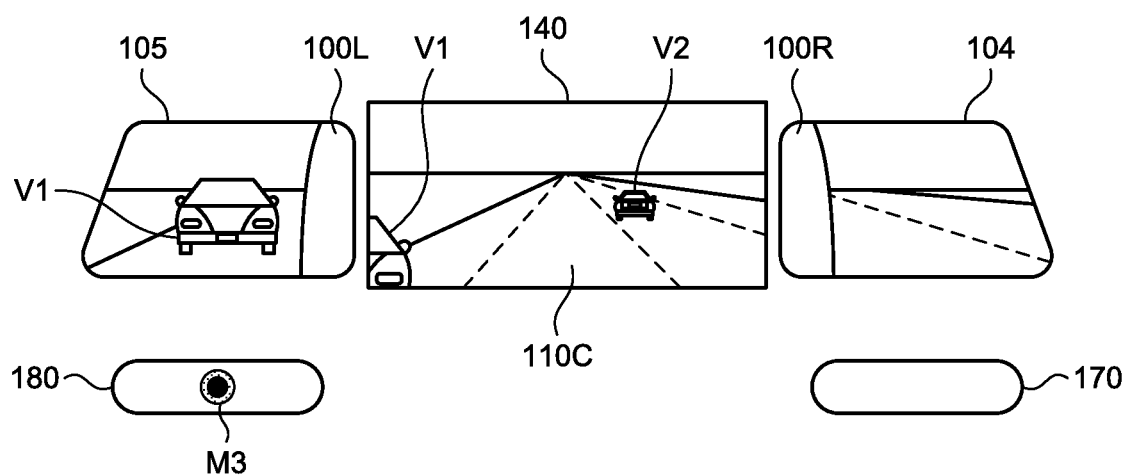
FIG. 33 is a diagram illustrating an example of video displayed on a rearview monitor, a right side mirror, and a left side mirror of the on-vehicle display system according to the sixth embodiment.

The right side mirror 104 is arranged on the right part of the vehicle 100 and displays the right side of the vehicle 100. The angle of the right side mirror 104 is freely adjustable. As illustrated in FIG. 33, the right side mirror 104 has an area in which the right side body 100R of the vehicle 100 appears and rear visibility is limited. FIG. 33 is a diagram illustrating an example of video displayed on the rearview monitor, the right side mirror, and the left side mirror of the on-vehicle display system according to the sixth embodiment. The right side mirror 104 includes the right side display unit 170 on the periphery thereof.

The left side mirror 105 is arranged on the left part of the vehicle 100 and displays the left side of the vehicle 100. The angle of the left side mirror 105 is freely adjustable. The left side mirror 105 has an area in which the left side body 100L of the vehicle 100 appears and rear visibility is limited. The left side mirror 105 includes the left side display unit 180 on the periphery thereof.

The right side display unit 170 is, for example, a display unit capable of displaying a desired shape, such as a circular shape or an arrow shape, or a character. The right side display unit 170 displays a shape, a character, or the like based on a control signal output from a display control unit 90B1 of an on-vehicle display control device 10B1 of the on-vehicle display system 1B1. The right side display unit 170 is arranged in a certain position so as to be easily viewed by the driver. More specifically, the right side display unit 170 is arranged on the right side of the dashboard 102 in the vehicle-width direction.

The left side display unit 180 is, for example, a display unit capable of displaying a desired shape, such as a circular shape or an arrow shape, or a character. The left side display unit 180 displays a shape, a character, or the like based on a control signal output from the display control unit 90B1 of the on-vehicle display control device 10B1 of the on-vehicle display system 1B1. The left side display unit 180 is arranged in a certain position so as to be easily viewed by the driver. More specifically, the left side display unit 180 is arranged on the left side of the dashboard 102 in the vehicle-width direction.

Referring back to FIG. 32, the on-vehicle display control device 10B1 includes the storage unit 20 and a control unit 30B1.

The control unit 30B1 includes a video data acquiring unit 40B1 including the rear video data acquiring unit 42, a clipping unit 50B1 that clips the first area AC that is a part of the first video data 110A, an identifying unit 60B1, the detecting unit 70B, and the display control unit 90B1.

The identifying unit 60B1 identifies the second area AR and the second area AL that are located on the lateral sides of the first area AC in the first video data 110A and that are checked by the right side mirror 104 and the left side mirror 105. Specifically, the identifying unit 60B1 identifies the second area AR and the second area AL in the first video data 110A based on the first video data 110A. More specifically, as illustrated in FIG. 24, the identifying unit 60B1 displays frame borders representing the second area AR and the second area AL together with the rear video data 110C on the rearview monitor 140, and makes settings in accordance with operation performed by the driver or the like. The driver or the like moves the frame borders to correct positions such that the right side mirror 104 and the left side mirror 105 match the frame borders displayed on the rearview monitor 140. In this manner, the identifying unit 60B1 identifies the second area AR and the second area AL in the first video data 110A. The process performed by the identifying unit 60B1 is performed when the angle of the rear camera 110, the right side mirror 104, or the left side mirror 105 is adjusted, or when the rear camera 110, the right side mirror 104, or the left side mirror 105 is replaced.

The display control unit 90B1 causes the rearview monitor 140 to display the rear video data 110C clipped by the clipping unit 50B1 as a normal display process that is performed in normal times.

The display control unit 90B1 determines whether a predetermined condition is satisfied for each frame or for each predetermined frame in addition to the normal display process as described above, and if the predetermined condition is satisfied, the display control unit 90B1 performs an identity display process of displaying identity of the rear moving object V. Specifically, if the rear moving object V detected by the detecting unit 70 moves across the first area AC and the second area AR or the second area AL, the display control unit 90B1 causes the rearview monitor 140, the right side display unit 170, and the left side display unit 180 to display an icon or indicator light M indicating the identity of the rear moving object V. More specifically, if the rear moving object V moves across the first area AC and the second area AR or the second area AL, the display control unit 90B1 causes the rearview monitor 140 to display the icon M in a manner superimposed on the position of the rear moving object V in the first video data 110A. If the rear moving object V moves across the first area AC and the second area AR, the display control unit 90B1 causes the right side display unit 170 to display the indicator light M at a certain position corresponding to the position of the rear moving object V in the first video data 110A. If the rear moving object V moves across the first area AC and the second area AL, the display control unit 90B1 causes the left side display unit 180 to display the indicator light M at a certain position corresponding to the position of the rear moving object V in the first video data 110A.

With reference to FIG. 24 and FIG. 33, FIG. 27 and FIG. 34, and FIG. 29 and FIG. 35, concrete examples of the identity display process performed by the display control unit 90B1 will be described.

First, states illustrated in FIG. 24 and FIG. 33 will be described. As illustrated in FIG. 33, the display control unit 90B1 causes the left side display unit 180 to display an indicator light M3 in a central portion thereof with respect to the rear moving object V1 moving from the first area AC to the second area AL.

Figure 34:
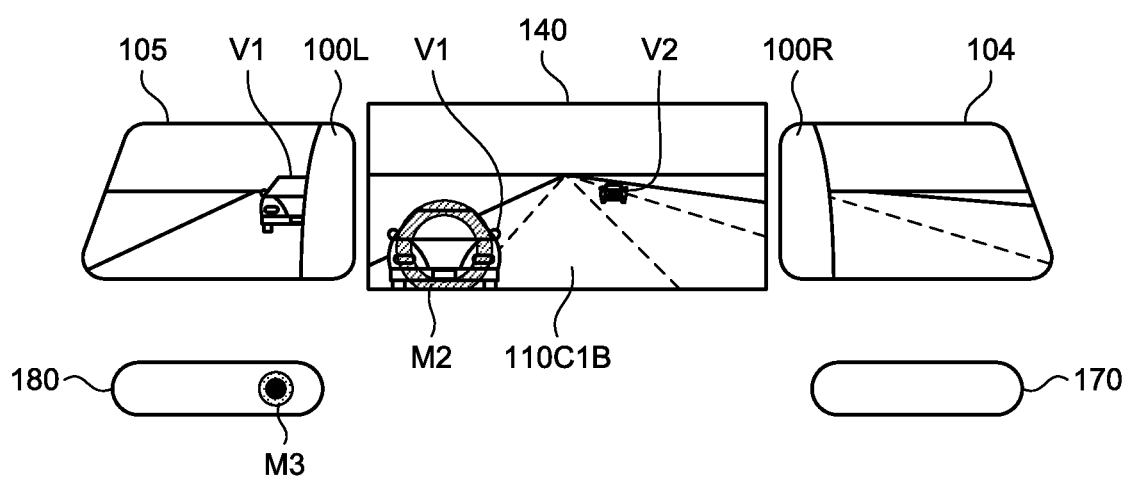
FIG. 34 is a diagram illustrating another example of video displayed on the rearview monitor, the right side mirror, and the left side mirror of the on-vehicle display system according to the sixth embodiment.

Next, states illustrated in FIG. 27 and FIG. 34, which are obtained slightly after the states illustrated FIG. 24 and FIG. 33, will be described. FIG. 34 is a diagram illustrating another example of video displayed on the rearview monitor, the right side mirror, and the left side mirror of the on-vehicle display system according to the sixth embodiment. As illustrated in FIG. 34, the display control unit 90B1 causes the rearview monitor 140 to display the icon M2 in a manner superimposed on the rear moving object V1 moving from the second area AL to the first area AC and displays the indicator light M3 on the right end of the left side display unit 180.

Figure 35:
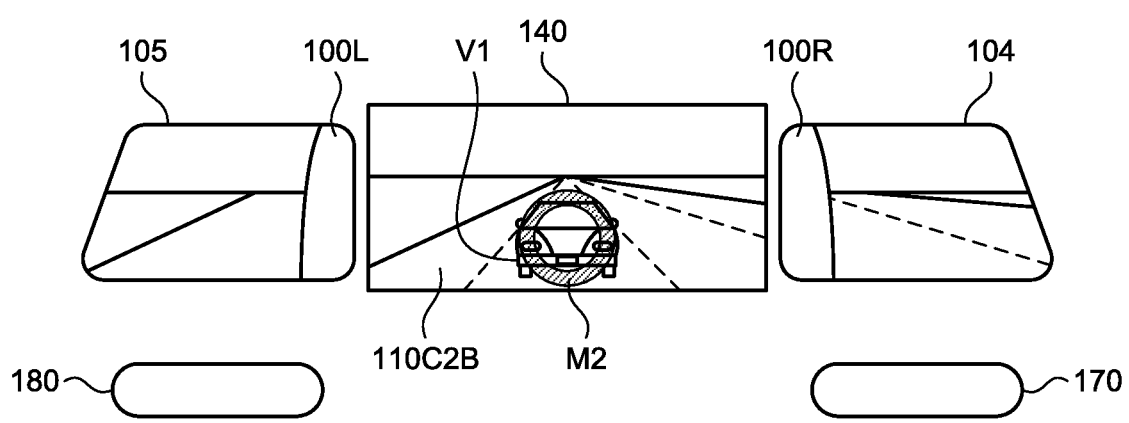
FIG. 35 is a diagram illustrating still another example of video displayed on the rearview monitor, the right side mirror, and the left side mirror of the on-vehicle display system according to the sixth embodiment.

Next, states illustrated in FIG. 29 and FIG. 35, which are obtained slightly after the states illustrated in FIG. 27 and FIG. 34, will be described. FIG. 35 is a diagram illustrating another example of video displayed on the rearview monitor, the right side mirror, and the left side mirror of the on-vehicle display system according to the sixth embodiment. As illustrated in FIG. 35, the display control unit 90B1 causes the rearview monitor 140 to display the icon M2 in a manner superimposed on the rear moving object V1 moving from the second area AL to the first area AC.

As described above, when the rear moving object V moves across the first area AC and the second area AR or the second area AL, the on-vehicle display system 1B1 according to the sixth embodiment causes the right side display unit 170 or the left side display unit 180 and the rearview monitor 140 to perform display indicating the identity of the rear moving object V. In this manner, even when the rear moving object V is displayed on the plurality of the right side mirror 104, the left side mirror 105, and the rearview monitor 140, the on-vehicle display system 1B1 can easily confirm the identity by displaying the icon M indicating the identity.

The components of the on-vehicle display system 1 illustrated in the drawings are conceptual function, and need not be physically configured in the manner illustrated in the drawings. In other words, specific forms of the apparatuses are not limited to those illustrated in the drawings, and all or part of the apparatuses may be functionally or physically distributed or integrated in arbitrary units depending on various loads or use conditions.

The configuration of the on-vehicle display system 1 is realized as software by, for example, a program or the like loaded on a memory. In the embodiments described above, it is explained that the functional blocks are implemented by cooperation with hardware or software. In other words, the functional blocks are realized in various forms using only hardware, using only software, or using a combination of hardware and software.

The components described above include one that can easily be thought of by a person skilled in the art and one that is practically identical. Further, the configurations described above may be combined appropriately. Furthermore, within the scope not departing from the gist of the present disclosure, various omission, replacement, and modifications of the components may be made.

If a plurality of rear moving objects V are detected in the first video data 110A at Step S11 in the flowchart illustrated in FIG. 6, the display control unit 90 may perform the processes from Step S12 for the rear moving objects V that meet a predetermined condition. More specifically, if a plurality of rear moving objects V are detected in the first video data 110A, the display control unit 90 may perform the processes from Step S12 for the rear moving object V located in the shortest distance from the vehicle 100 on each of the blind spot area BR side and the blind spot area BL side in the first video data 110A. With this operation, the on-vehicle display system 1 can check the rear moving object V that needs to be checked on a priority basis, such as the closest one, from among the plurality of detected rear moving objects V. In this manner, the on-vehicle display system 1 can appropriately check surroundings of the vehicle 100.

In addition to the determination at Steps S11 to S13 in the flowchart illustrated in FIG. 6, the display control unit 90 may determine whether a relative speed of the rear moving object V and the vehicle 100 satisfies a predetermined condition. For example, the display control unit 90 may perform the processes from Step S14 if the relative speed of the rear moving object V and the vehicle 100 is equal to or greater than a predetermined value. Here, the relative speed of the rear moving object V and the vehicle 100 can be calculated based on a change in the size of an image of the rear moving object V in each of the frames in the first video data 110A. With this operation, the on-vehicle display system 1 can appropriately check surroundings of the vehicle 100.

When detecting the rear moving object V, the recognizing unit 71 may adopt, as a detection target, only the rear moving object V that is recognized as a front face of the vehicle 100, by using a recognition dictionary capable of distinguishing the front face and the rear face of the vehicle 100. If the rear face of the vehicle 100 is recognized, the detected vehicle is a vehicle heading in the opposite direction, such as an oncoming vehicle, and therefore can be eliminated from the detection target.

Further, the display control unit 90 may determine as Yes at each Step when the determination condition is continuously satisfied for a certain period of time at Steps S11 to S14 and S16 in the flowchart illustrated in FIG. 6. With this operation, the on-vehicle display system 1 can prevent an unnecessary change of the video displayed on the right side monitor 150 and the left side monitor 160. In this manner, the on-vehicle display system 1 can appropriately check surroundings of the vehicle 100.

The display control unit 90 may determine whether to perform the process in the flowchart illustrated in FIG. 6 based on a current location of the vehicle 100 before Step S11 in the flowchart illustrated in FIG. 6. For example, the display control unit 90 may include a current location data acquiring unit that acquires a current location of the vehicle 100 and a surrounding situation data acquiring unit that acquires surrounding situations including map information, and if the vehicle 100 is travelling in a predetermined spot, such as downtown, the display control unit 90 may not perform the process in the flowchart illustrated in FIG. 6. Alternatively, the display control unit 90 may include the current location data acquiring unit and the surrounding situation data acquiring unit, and if the vehicle 100 is travelling at a predetermined speed or higher, the display control unit 90 may perform the process in the flowchart illustrated in FIG. 6.

When displaying the second right rear video data 110R2 or the second left rear video data 110L2 on the right side monitor 150 or the left side monitor 160, the display control unit 90 may display the whole or a part of the data in a translucent color having a predetermined translucency. With this operation, the on-vehicle display system 1 can easily confirm that the right side monitor 150 or the left side monitor 160 displays the second right rear video data 110R2 or the second left rear video data 110L2 rather than the normal display. In this manner, the on-vehicle display system 1 can appropriately check surroundings of the vehicle 100.

The display control unit 90A may display an area including the extended video data 110B1, the extended video data 110B2, the extended video data 110B3, the extended video data 110B4, or the extended video data 110B5 in a translucent color having a predetermined translucency. With this operation, the on-vehicle display system 1A can easily confirm that display on the rearview monitor 140 includes the extended video data 110B. In this manner, the on-vehicle display system 1A can appropriately check surroundings of the vehicle 100.

If the detecting unit 70 detects that the rear moving object V is present in the blind spot area BR and the blind spot area BL, the display control unit 90A may change an angle of view of the rearview monitor 140 so as to include the blind spot area BR and the blind spot area BL on the display screen of the rearview monitor 140. With this operation, the on-vehicle display system 1A can check the rear moving object V present in each of the blind spot area BR and the blind spot area BL. In this manner, the on-vehicle display system 1A can appropriately check surroundings of the vehicle 100.

If a plurality of rear moving objects V are detected in the first video data 110A at Step SA11 in the flowchart illustrated in FIG. 16, the display control unit 90A may perform the processes at Steps SA12 and SA13 for the rear moving objects V that meet a predetermined condition. For example, the display control unit 90A may perform the processes at Steps SA12 and SA13 for the rear moving object V located in the shortest distance from the vehicle 100 on each of the blind spot area BR side and the blind spot area BL side in the first video data 110A. With this operation, the on-vehicle display system 1A can check the rear moving object V that needs to be checked on a priority basis, such as the closest one, from among the plurality of detected rear moving objects V. In this manner, the on-vehicle display system 1A can appropriately check surroundings of the vehicle 100.

At Step SA11 in the flowchart illustrated in FIG. 16, the display control unit 90A may determine whether a distance between the rear moving object V and the vehicle 100, a relative speed of the rear moving object V and the vehicle 100, and a moving state, such as a moving direction, of the rear moving object V meet predetermined conditions in addition to determining whether the rear moving object V is detected in the first video data 110A. More specifically, for example, when the detecting unit 70 detects that the distance between the rear moving object V and the vehicle 100 is equal to or shorter than a predetermined distance, the display control unit 90A may determine that the moving state satisfies a predetermined condition and perform the processes at Step SA12 and SA13. Here, the distance between the rear moving object V and the vehicle 100 can be calculated based on the size of the image of the rear moving object V in the first video data 110A and the size of the rear moving object V stored in the recognition dictionary storage unit 200. Further, for example, when the detecting unit 70 detects that the relative speed of the rear moving object V and the vehicle 100 is equal to or higher than a predetermined value, the display control unit 90A may determine that the moving state satisfies a predetermined condition and perform the processes at Step SA12 and SA13. Here, the relative speed of the rear moving object V can be calculated based on a change in the size of the image of the rear moving object V in each of the frames in the first video data 110A. Furthermore, for example, when the detecting unit 70 detects that the moving direction of the rear moving object V is a direction approaching the vehicle 100, the display control unit 90A may determine that the moving state satisfies a predetermined condition and perform the processes at Step SA12 and SA13. The display control unit 90A may perform determination using a combination of the determination conditions as described above. Through the operation as described above, the on-vehicle display system 1A can appropriately check surroundings of the vehicle 100.

The display control unit 90A may determine whether to perform the process in the flowchart illustrated in FIG. 16 based on a current location of the vehicle 100 before Step SA11 in the flowchart illustrated in FIG. 16. For example, the display control unit 90A may include a current location data acquiring unit that acquires a current location of the vehicle 100 and a surrounding situation data acquiring unit that acquires surrounding situations including map information, and if the vehicle 100 is travelling in a predetermined spot, such as downtown, the display control unit 90A may not perform the process in the flowchart illustrated in FIG. 16. Alternatively, the display control unit 90A may include the current location data acquiring unit and the surrounding situation data acquiring unit, and if the vehicle 100 is travelling at a predetermined speed or higher, the display control unit 90A may perform the process in the flowchart illustrated in FIG. 16.

If the detected rear moving object V is present in an outside area adjacent to the blind spot area BR or the blind spot area BL at Step SA11 in the flowchart illustrated in FIG. 16, the display control unit 90A may cause the rearview monitor 140 to display presence of the rear moving object V on. For example, the display control unit 90A may display an icon, such as an arrow, indicating an existing direction or an approaching direction of the rear moving object V that is present in the outside area adjacent to the blind spot area BR or the blind spot area BL, or may cause the edges of the rearview monitor 140 to blink on and off.

If a plurality of rear moving objects V are detected in the first video data 110A at Step SB11 in the flowchart in FIG. 26, the display control unit 90B may perform the processes from Step SB12 to SB20 for the rear moving objects V that meet a predetermined condition. More specifically, if a plurality of rear moving objects V are detected in the first video data 110A, the display control unit 90B may perform the processes from Step SB12 for the rear moving object V located in the shortest distance from the vehicle 100 on each of the second area AR side and the second area AL side in the first video data 110A. With this operation, the on-vehicle display system 1B can display the identity of the rear moving object V that needs to be checked on a priority basis, such as the closest one, from among the plurality of detected rear moving objects V. In this manner, the on-vehicle display system 1B can easily and appropriately check the identity of the rear moving object V.

At Step SB11 in the flowchart illustrated in FIG. 26, the display control unit 90B may determine whether a distance between the rear moving object V and the vehicle 100, a relative speed of the rear moving object V and the vehicle 100, and a moving state, such as a moving direction, of the rear moving object V meet predetermined conditions in addition to determining whether the rear moving object V is detected in the first video data 110A. More specifically, for example, when the detecting unit 70 detects that the distance between the rear moving object V and the vehicle 100 is equal to or shorter than a predetermined distance, the display control unit 90B may determine that the moving state satisfies a predetermined condition and perform the processes at Steps SB12 to SB20. Here, the distance between the rear moving object V and the vehicle 100 can be calculated based on the size of the image of the rear moving object V in the first video data 110A and the size of the rear moving object V stored in the recognition dictionary storage unit 200. Further, for example, when the detecting unit 70 detects that the relative speed of the rear moving object V and the vehicle 100 is equal to or higher than a predetermined value, the display control unit 90B may determine that the moving state satisfies a predetermined condition and perform the processes at Step SB12 to SB20. Here, the relative speed of the rear moving object V and the vehicle 100 can be calculated based on a change in the size of an image of the rear moving object V in each of the frames in the first video data 110A. Furthermore, for example, when the detecting unit 70 detects that the moving direction of the rear moving object V is a direction approaching the vehicle 100, the display control unit 90B may determine that the moving state satisfies a predetermined condition and perform the processes at Step SB12 to SB20. The display control unit 90B may perform determination using a combination of the determination conditions as described above. Through the operation as described above, the on-vehicle display system 1B can easily and appropriately check the identity of the rear moving object V.

The display control unit 90B may display the identity when the determination condition is continuously satisfied for a certain period of time at Steps SB11 to SB13, SB15, SB17, and SB19 in the flowchart illustrated in FIG. 26. With this operation, the on-vehicle display system 1B can prevent unnecessary display of the identity of the rear moving object V. In this manner, the on-vehicle display system 1B can easily and appropriately check the identity of the rear moving object V.

The display control unit 90B may determine whether to perform the process in the flowchart illustrated in FIG. 26 based on a current location of the vehicle 100 before Step SB11 in the flowchart illustrated in FIG. 26. For example, the display control unit 90B may include a current location data acquiring unit that acquires a current location of the vehicle 100 and a surrounding situation data acquiring unit that acquires surrounding situations including map information, and if the vehicle 100 is travelling in a predetermined spot, such as downtown, the display control unit 90B may not perform the process in the flowchart illustrated in FIG. 26. Alternatively, the display control unit 90B may include the current location data acquiring unit and the surrounding situation data acquiring unit, and if the vehicle 100 is travelling at a predetermined speed or higher, the display control unit 90B may perform the process in the flowchart illustrated in FIG. 26.

If the detected rear moving object V is present in the blind spot at Step SB11 in the flowchart illustrated in FIG. 26, the display control unit 90B may cause the rearview monitor 140, the right side monitor 150, and the left side monitor 160, or on the rearview monitor 140, the right side display unit 170, and the left side display unit 180 to display an approaching direction (appearing direction) of the rear moving object V using an icon, such as an arrow, or a warning light. For example, the display control unit 90B may display an icon, such as an arrow, indicating an existing direction or an approaching direction of the rear moving object V that is present in an outside area adjacent to the blind spot, or may cause the edges of the rearview monitor 140 to blink on and off.

If it is determined as No at Step SB12 in the flowchart illustrated in FIG. 26, the display control unit 90B may determine whether the moving direction of the detected rear moving object V is toward the first area AC, the second area AR, or the second area AL, and if it is determined that the direction is toward the first area AC, the second area AR, or the second area AL, the display control unit 90B may cause the rearview monitor 140, the right side monitor 150, and the left side monitor 160, or on the rearview monitor 140, the right side display unit 170, and the left side display unit 180 to display the approaching direction (appearing direction) of the rear moving object V by displaying an icon, such as an arrow, or a warning light in a superimposed manner, similarly to the above.

According to the present disclosure, it is possible to appropriately check surroundings of a vehicle.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An on-vehicle display control device comprising:
   a rear video data acquiring circuit configured to acquire first video data from a rear camera that is arranged on a rear part of the vehicle and that is configured to image a rear side of the vehicle;
   a clipper configured to clip a first area that is a part of the first video data acquired by the rear video data acquiring circuit;
   an identifying circuit configured to identify a second area and a blind spot area in the first video data, the second area being located on a lateral side of the first area and checked by a lateral rear checking device of the vehicle, the blind spot area being located on the lateral side of the first area and corresponding to a blind spot of the lateral rear checking device displaying an image of the lateral side of the vehicle;
   a detector configured to detect presence and a moving direction of a rear moving object by performing moving object recognition in the first video data;
   a determining unit configured to determine whether the rear moving object detected by the detector is present in the blind spot area; and
   a display controller configured to cause a rearview monitor that displays rear video of the vehicle to display video clipped as the first area, and cause the lateral rear checking device and the rearview monitor to perform display indicating identity of the rear moving object moving across the first area and the second area and cause the lateral rear checking device to display the blind spot area if the detector detects the rear moving object moving across the first area and the second area and if the determining unit determines that the rear moving object is present in the blind spot area.

2. The on-vehicle display control device according to claim 1, wherein
   the detector is further configured to detect at least one of approach of the rear moving object to the vehicle and a relative speed of the rear moving object and the vehicle, and
   the display controller is further configured to cause the lateral rear checking device and the rearview monitor to perform display indicating identity of the rear moving object moving across the first area and the second area if the detector detects the rear moving object moving across the first area and the second area and approaching the vehicle or if the detector detects the rear moving object moving across the first area and the second area and having the relative speed that is equal to or greater than a predetermined value.

3. The on-vehicle display control device according to claim 1, further comprising:

a lateral rear video data acquiring circuit configured to acquire second video data from a lateral rear camera that is arranged on a lateral part of the vehicle and that is configured to image a lateral rear side of the vehicle, wherein the lateral rear checking device is a side monitor configured to display video of a lateral side of the vehicle, and the display controller is further configured to cause the side monitor to display video of the second video data acquired by the lateral rear video data acquiring circuit and cause the side monitor and the rearview monitor to perform display indicating identity of the rear moving object moving across the first area and the second area if the detector detects the rear moving object moving across the first area and the second area.

4. The on-vehicle display control device according to claim 3, wherein the display controller is further configured to cause the side monitor to display an icon indicating identity of the rear moving object in a manner superimposed on a position in the second video data corresponding to a position of the rear moving object detected in the first video data if the detector detects the rear moving object moving across the first area and the second area, and cause the rearview monitor to display an icon indicating the identity of the rear moving object in a manner superimposed on the position of the rear moving object detected in the first video data.

5. The on-vehicle display control device according to claim 1, wherein the lateral rear checking device is a side mirror that is arranged on the vehicle and that includes a side display unit on a periphery thereof, the identifying circuit is further configured to identify the second area that is located on the lateral side of the first area in the first video data and that is checked by the side mirror, wherein the display controller is further configured to cause the side display unit and the rearview monitor to perform display indicating identity of the rear moving object moving across the first area and the second area if the detector detects the rear moving object moving across the first area and the second area.

6. An on-vehicle display system comprising:

the on-vehicle display control device according to claim 1; and at least one of the rear camera, the rearview monitor, and the lateral rear checking device.

7. An on-vehicle display control method comprising steps of:

acquiring first video data from a rear camera that is arranged on a rear part of a vehicle and that is configured to image a rear side of the vehicle;

clipping a first area that is a part of the first video data acquired at the acquiring step;

identifying a second area and a blind spot area in the first video data, the second area being located on a lateral side of the first area and checked by a lateral rear checking device of the vehicle, the blind spot area being located on the lateral side of the first area and corresponding to a blind spot of the lateral rear checking device displaying an image of the lateral side of the vehicle;

detecting presence and a moving direction of a rear moving object by performing moving object recognition in the first video data;

determining whether the rear moving object detected by the detecting step is present in the blind spot area; and causing a rearview monitor that displays rear video of the vehicle to display video clipped as the first area, and causing the lateral rear checking device and the rearview monitor to perform display indicating identity of the rear moving object moving across the first area and a second area and causing the lateral rear checking device to display the blind spot area if the detecting step detects the rear moving object moving across the first area and the second area and if the determining step determines that the rear moving object is present in the blind spot area.

8. A non-transitory storage medium that stores a program for causing a computer serving as an on-vehicle display control device to execute steps of:

acquiring first video data from a rear camera that is arranged on a rear part of a vehicle and that is configured to image a rear side of the vehicle;

clipping a first area that is a part of the first video data acquired at the acquiring step;

identifying a second area and a blind spot area in the first video data, the second area being located on a lateral side of the first area and checked by a lateral rear checking device of the vehicle, the blind spot area being located on the lateral side of the first area and corresponding to a blind spot of the lateral rear checking device displaying an image of the lateral side of the vehicle;

detecting presence and a moving direction of a rear moving object by performing moving object recognition in the first video data;

determining whether the rear moving object detected by the detecting step is present in the blind spot area; and causing a rearview monitor that displays rear video of the vehicle to display video clipped as the first area, and causing the lateral rear checking device and the rearview monitor to perform display indicating identity of the rear moving object moving across the first area and the second area and causing the lateral rear checking device to display the blind spot area if the detecting step detects the rear moving object moving across the first area and the second area and if the determining step determines that the rear moving object is present in the blind spot area.

\* \* \* \* \*